US012527512B2

(12) United States Patent
Attia

(10) Patent No.: US 12,527,512 B2
(45) Date of Patent: Jan. 20, 2026

(54) SYSTEM AND A METHOD FOR SCREENING FOR CARDIAC AMYLOIDOSIS BY ELECTROCARDIOGRAPHY

(71) Applicant: Mayo Foundation for Medical Education and Research, Rochester, MN (US)

(72) Inventor: Itzhak Zachi Attia, Rochester, MN (US)

(73) Assignee: Mayo Foundation for Medical Education and Research, Rochester, MN (US)

( * ) Notice: Subject to any disclaimer, the term of this patent is extended or adjusted under 35 U.S.C. 154(b) by 0 days.

(21) Appl. No.: 18/642,200

(22) Filed: Apr. 22, 2024

(65) Prior Publication Data

US 2024/0341660 A1    Oct. 17, 2024

Related U.S. Application Data

(63) Continuation of application No. PCT/US2023/020362, filed on Apr. 28, 2023.

(60) Provisional application No. 63/336,493, filed on Apr. 29, 2022.

(51) Int. Cl.
*A61B 5/349* (2021.01)
*G16H 10/60* (2018.01)

(52) U.S. Cl.
CPC ............. *A61B 5/349* (2021.01); *G16H 10/60* (2018.01)

(58) Field of Classification Search
CPC ................................ A61B 5/349; G16H 10/60

USPC ......................................................... 600/509
See application file for complete search history.

(56) References Cited

U.S. PATENT DOCUMENTS

| 11,972,869 B2 * | 4/2024 | Wagner .................. G16H 10/60 |
| 2005/0130321 A1 | 6/2005 | Nicholson et al. |
| 2014/0187519 A1 | 7/2014 | Cooke et al. |
| 2018/0146879 A9 | 5/2018 | Fadem et al. |
| 2019/0290232 A1 | 9/2019 | Garg et al. |
| 2020/0405148 A1 | 12/2020 | Tran et al. |
| 2022/0189636 A1 * | 6/2022 | Wagner .................... G06N 3/08 |
| 2022/0378379 A1 * | 12/2022 | Zimmerman ........ A61B 5/7275 |

FOREIGN PATENT DOCUMENTS

WO     2022081646 A1    4/2022

OTHER PUBLICATIONS

Feeny et al. Artificial Intelligence and Machine Learning in Arrhythmias and Cardiac Electrophysiologyâ Circulation: Arrhythmia and Electrophysiology vol. 13, No. 8 (Year: 2020).*

(Continued)

*Primary Examiner* — Shirley X Jian
(74) *Attorney, Agent, or Firm* — Caldwell Intellectual Property Law

(57) ABSTRACT

A method for screening for cardiac amyloidosis by electrocardiography is disclosed. The method includes receiving, using at least a processor, voltage-time data of a subject, wherein the voltage-time data comprises voltage data from a plurality of leads of an electrocardiograph. The method includes generating, using the at least a processor, a feature vector from the voltage-time data. The method includes identifying, using the at least a processor, the presence or absence of cardiac amyloidosis (CA) in the subject as a function of the feature vector using a learning system.

20 Claims, 10 Drawing Sheets

(56) References Cited

OTHER PUBLICATIONS

Raghunath S. et al. Prediction of mortality from 12-lead electrocardiogram voltage data using a deep neural network. Nat Med. Jun. 2020;26(6):886-891. doi: 10.1038/s41591-020-0870-z. Epub May 11, 2020. PMID: 32393799 (Year: 2020).*

Muchtar E, Gertz MA, Kumar SK, et al. Improved outcomes for newly diagnosed AL amyloidosis between 2000 and 2014: cracking the glass ceiling of early death. Blood. 2017;129(15): 2111-2119.

Lousada I, Comenzo RL, Landau H, Guthrie S, Merlini G. Light chain amyloidosis: patient experience survey from the Amyloidosis Research Consortium. Adv Ther. 2015;32(10):920-928.

Ruberg FL, Grogan M, Hanna M, Kelly JW, Maurer MS. Transthyretin amyloid cardiomyopathy: JACC state-of-the-art review.l Am Coll Cardiol. 2019;73(22):2872-2891.

Alexander KM, Evangelisti A, Witteles RM. Diagnosis and treatment of cardiac amyloidosis related to plasma cell dyscrasias. Cardiol Clin. 2019;37(4):487-495.

Maurer MS, Schwartz JH, Gundapaneni B, et al. Tafamidis treatment for patients with transthyretin amyloid cardiomyopathy. N Engl J Med. 2018;379(11):1007-1016.

Falk RH, Alexander KM, Liao R, Dorbala S. AL (light-chain) cardiac amyloidosis: a review of diagnosis and therapy. J Am Coll Cardiol. 2016;68(12):1323-1341.

Gertz MA, Dispenzieri A, Sher T. Pathophysiology and treatment of cardiac amyloidosis. Nat Rev Cardiol. 2015;12(2):91-102.

Grogan M, Scott CG, Kyle RA, et al. Natural history of wild-type transthyretin cardiac amyloidosis and risk stratification using a novel staging system [erratum appears in J Am Coll Cardiol. 2017;69(23):2882]. J Am Coll Cardiol. 2016;68(10):1014-1020.

Gillmore JD, Maurer MS, Falk RH, et al. Non-biopsy diagnosis of cardiac transthyretin amyloidosis. Circulation. 2016; 133(24):2404-2412.

Sperry BW, Ikram A, Hachamovitch R, et al. Efficacy of chemotherapy for light-chain amyloidosis in patients presenting with symptomatic heart failure. J Am Coll Cardiol. 2016;67(25): 2941-2948.

Murtagh B, Hammill SC, Gertz MA, Kyle RA, Tajik AJ, Grogan M. Electrocardiogra findings in primary systemic amyloidosis and biopsy-proven cardiac involvement. Am J Cardiol. 2005;95(4):535-537.

Ko WY, Siontis KC, Attia ZI, et al. Detection of hypertrophic cardiomyopathy using a convolutional neural network-enabled electrocardiogram. J Am Coll Cardiol. 2020;75(7):722-733.

Vrana JA. Classification of amyloidosis by laser microdissection and mass spectrometry based proteomic analysis in clinical biopsy specimens. Blood. 2009; 114(24):4957-4959.

Dorbala S, Ando Y, Bokhari S, et al. ASNC/AHA/ASE/EANM/HFSA/ISA/SCMR/SNMMI expert consensus recommendations for multimodality imaging in cardiac amyloidosis: part 2 of 2ddiagnostic criteria and appropriate utilization. J Card Fail.2019;25(11):854-865.

Attia ZI, Friedman PA, Noseworthy PA, et al. Age and sex estimation using artificial intelligence from standard 12-lead ECGs. Circ Arrhythm Electrophysiol. 2019;12(9):e007284.

Goodfellow I, Bengio Y, Courville A. Deep Learning. Cambridge, MA: The MIT Press; 2016.

Youden Wj. Index for rating diagnostic tests. Cancer. 1950;3(1): 32-35.

R Core Team. R: a language and environment for statistical computing, version 3.5. 3. Vienna, Austria: R Foundation for Statistical Computing; 2019.

Gurwitz JH, Maurer MS. Tafamidisda pricey therapy for a not-so-rare condition. JAMA Cardiol.2020;5(3):247-248.

Castano A, Narotsky DL, Hamid N, et al. Unveiling transthyretin cardiac amyloidosis and its predictors among elderly patients with severe aortic stenosis undergoing transcatheter aortic valve replacement. Eur Heart J. 2017;38(38):2879-2887.

Gonzalez-Lopez E, Gallego-Delgado M, Guzzo-Merello G, et al. Wild-type transthyretin amyloidosis as a cause of heart failure with preserved ejection fraction. Eur Heart J. 2015;36(38): 2585-2594.

Buxbaum JN, Ruberg FL. Transthyretin VI221 (pV142l)* cardiac amyloidosis: an agedependent autosomal dominant cardiomyopathy too common to be overlooked as a cause of significant heart disease in elderly African Americans. Genet Med. 2017; 19(7):733-742.

Rapezzi C, Merlini G, Quarta CC. Systemic cardiac amyloidosis: disease profiles and clinical courses of the 3 main types. Circulation. 2009; 120(13):1203-1212.

Maleszewski JJ. Cardiac amyloidosis: pathology, nomenclature, and typing. Cardiovasc Pathol. 2015;24(6):343-350.

Fealey ME, Edwards WD, Buadi FK, Syed IS, Grogan M. Echocardiographic features of cardiac amyloidosis presenting as endomyocardial disease in a 54-year-old male. J Cardiol. 2009;54(1):162-166.

Suresh R. Advanced cardiac amyloidosis associated with normal interventricular septal thickness: an uncommon presentation of infiltrative cardiomyopathy. J Am Soc Echocardiogr. 2014;27(4): 440-447.

Tison GH, Zhang J, Delling FN, Deo RC. Automated and interpretable patient ECG profiles for disease detection, tracking, and discovery. Circ Cardiovasc Qua! Outcomes. 2019; 12(9): e005289.

International Search Report; PCT/US2023/020362; Date: Jul. 31, 2023; By: Authorized Officer: Taina Matos.

* cited by examiner

SYSTEM AND A METHOD FOR SCREENING FOR CARDIAC AMYLOIDOSIS BY ELECTROCARDIOGRAPHY

CROSS-REFERENCE TO RELATED APPLICATIONS

This application is a continuation of Patent Cooperation Treaty (PCT) Application No. PCT/US2023/020362, filed on Apr. 28, 2023, and entitled "ARTIFICIAL-INTELLIGENCE ENHANCED SCREENING FOR CARDIAC AMYLOIDOSIS BY ELECTROCARDIOGRAPHY," which claims the benefit of priority to U.S. Provisional Patent Application Ser. No. 63/336,493, filed on Apr. 29, 2022, and titled "ARTIFICIAL-INTELLIGENCE ENHANCED SCREENING FOR CARDIAC AMYLOIDOSIS BY ELECTROCARDIOGRAPHY," which are each incorporated by reference herein in their entirety.

FIELD OF THE INVENTION

The present invention generally relates to the field of artificial intelligence. In particular, the present invention is directed to a system and a method for screening for cardiac amyloidosis by electrocardiography.

BACKGROUND

Embodiments of the present disclosure relate to methods for the detection and treatment of cardiac amyloidosis. Cardiac amyloidosis (CA), once thought to be rare and universally fatal, is now recognized as an important cause of heart failure, particularly in patients with preserved ejection fraction. Advances in therapy have led to significant improvement in outcomes, but survival is hindered by life-threatening delays in diagnosis. Whereas more than 30 proteins may misfold to cause amyloidosis, two main types involve the heart: light chain-associated amyloid (AL), due to a clonal plasma cell disorder of the bone marrow; and transthyretin amyloid (ATTR), related to misfolding of transthyretin produced by the liver. ATTR may result from either an inherited mutation in the transthyretin gene (ATTRv) or from "wild-type" (genetically normal) transthyretin deposition (ATTRwt). Treatment is available for both AL and ATTR amyloidosis and is rapidly improving. If it is untreated, cardiac AL amyloidosis is rapidly progressive and fatal. Despite improvements in chemotherapy, approximately 25% of patients with AL amyloidosis die of advanced cardiac disease within six months of diagnosis.[1] Whereas cardiac ATTR amyloidosis is more slowly progressive, the median survival is approximately 3.5 years in ATTRwt and somewhat less in ATTRv.

Accordingly, embodiments of the invention disclosed herein include algorithms applied to electrocardiograms (ECGs), a non-invasive procedure, in the diagnostic workup of CA for the detection of CA and stratification of patients based on the risk of CA, allowing earlier diagnosis and intervention.

SUMMARY OF THE DISCLOSURE

According to embodiments of the present disclosure, methods of and computer program products for the detection of cardiac amyloidosis (CA) are provided.

In some aspects of the invention, disclosed herein are methods comprising receiving voltage-time data of a subject, the voltage-time data comprising voltage data of a plurality of leads of an electrocardiograph; generating a feature vector from the voltage-time data; providing the feature vector to a pretrained learning system; and receiving from the pretrained learning system an indication of the presence or absence of cardiac amyloidosis in the subject.

Aspects of the invention, as disclosed herein, also include a system comprising: an electrocardiograph comprising a plurality of leads; a computing node comprising a computer readable storage medium having program instructions embodied therewith, the program instructions executable by a processor of the computing node to cause the processor to perform a method comprising: receiving voltage-time data of a subject from the echocardiograph, the voltage-time data comprising voltage data of the plurality of leads; generating a feature vector from the voltage-time data; providing the feature vector to a pretrained learning system; and receiving from the pretrained learning system an indication of the presence or absence of cardiac amyloidosis in the subject.

In certain aspects of the invention, disclosed herein is a computer program product for detection of cardiac amyloidosis, the computer program product comprising a computer readable storage medium having program instructions embodied therewith, the program instructions executable by a processor to cause the processor to perform a method comprising: receiving voltage-time data of a subject from the echocardiograph, the voltage-time data comprising voltage data of the plurality of leads; generating a feature vector from the voltage-time data; providing the feature vector to a pretrained learning system; and receiving from the pretrained learning system an indication of the presence or absence of cardiac amyloidosis in the subject.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

Patients with systemic amyloidosis are commonly evaluated by multiple providers before the diagnosis is established, often requiring travel to a national center.[2] Cardiologists commonly evaluate these patients, but a correct diagnosis is established in only 18.7% in one study.[2] Early symptoms may be vague and attributed to other causes, requiring a high index of suspicion. Whereas advances in cardiac imaging have improved the diagnosis, classic findings are not always present or may go unrecognized, especially if amyloidosis has not been suggested by the referring provider. As cardiac involvement in systemic amyloidosis is the most important determinant of survival, there is a critical need for early diagnosis to promote timely and effective therapy.

Whereas classic electrocardiographic findings of AL CA include low-voltage and pseudo in fact patterns, present in approximately 45% of patients, neither normal voltage nor electrocardiographic criteria for left ventricular hypertrophy (LVH) exclude the diagnosis.[11] Despite more severe degrees of myocardial infiltration, low voltage is present in only approximately 25% of patients with ATTRwt.[3] Conduction system disease and ST-segment and T-wave abnormalities are common in both types of CA but are nonspecific. Artificial intelligence (AI)-driven models have been reported to permit identification of occult and impending disease from electrocardiographic findings that appear non-specific or insignificant to expert reviewers.

Figure 4:
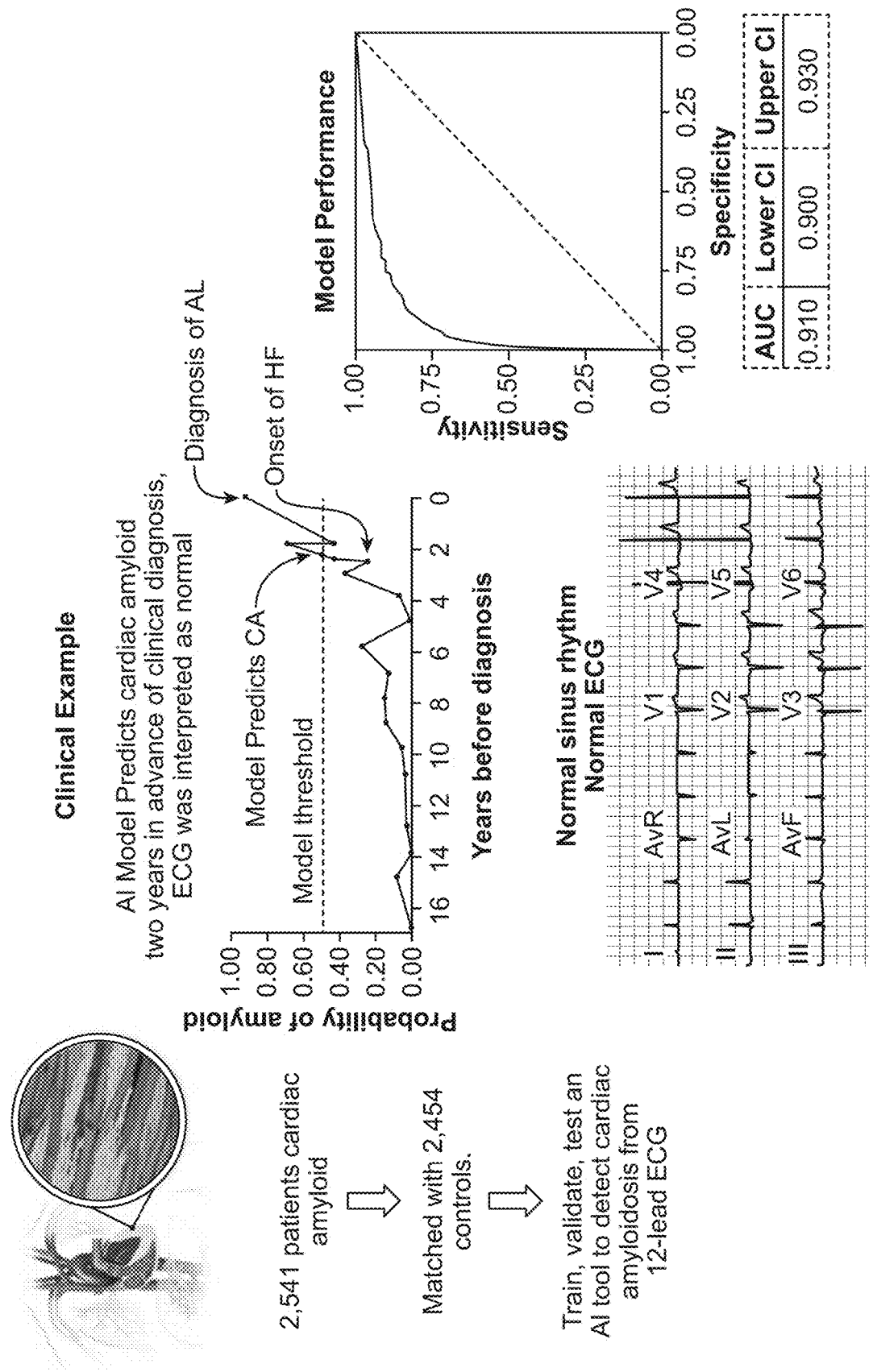
FIG. 4 is an exemplary embodiment of schematic summary of: the study design (left); a clinical example of early detection of cardiac amyloid using AI-enhanced ECG, prior to clinical diagnosis (center, top); normal 12-lead ECG at the time the model predicted cardiac amyloid (center, bottom); and model performance (right).

Disclosed herein is the development of an artificial intelligence (AI)-based tool to detect cardiac amyloidosis (CA) from a standard 12-lead electrocardiogram (ECG). To test AI-driven models for early detection of CA, a novel AI-electrocardiogram (ECG) network was developed. Convolutional neural networks offer a comprehensive approach to analyzing and interpreting the vast amount of data generated in a single ECG. Algorithms were developed using 12-lead ECG data collected from 2541 patients with light chain or transthyretin CA seen at Mayo Clinic between 2000 and 2019. Cases were nearest neighbor matched for age and sex, with 2454 controls. A subset of 2997 (60%) cases and controls were used to train a deep neural network to predict the presence of CA with an internal validation set (n=999; 20%) and a randomly selected holdout testing set (n=999; 20%). (FIG. 4) Experiments were performed using single-lead and 6-lead ECG subsets. Furthermore, because smart-phone-enabled electrodes permit point-of-care diagnosis with single-lead and 6-lead options, compatible networks were developed and tested.

All models used voltage-time information from 12-lead ECGs as inputs. Modeling techniques explored included convolutional neural networks with differing structures such as using all 12 leads as a single input; groups of 6 leads as separate inputs, each lead converted to spectrogram; a single lead as input; and combinations of these methods. Thus, embodiments of the invention disclosed herein include use of at least 1 to 12 leads. Additionally, the disease may also comprise an underlying genetic component, which is supported by the detection of these diagnostic signals prior to diagnosis. The methods disclosed herein may be coupled with a genetic panel to provide further specificity and sensitivity. Similarly, such methods may be used with genetic and biomarker panels (e.g., cardiac biomarkers B-type natriuretic peptide (BNP), N-terminal (NT)-pro hormone BNP (NT-proBNP), troponin) for early and accurate detection of disease, and to detect novel biomarkers of disease.

Accordingly, in some aspects of the invention, disclosed herein are methods comprising receiving voltage-time data of a subject, the voltage-time data comprising voltage data of a plurality of leads of an electrocardiograph; generating a feature vector from the voltage-time data; providing the feature vector to a pretrained learning system; and receiving from the pretrained learning system an indication of the presence or absence of cardiac amyloidosis in the subject. Generating the feature vector may comprise generating a spectrogram based on the voltage data of the plurality of leads. In some embodiments generating the feature vector comprises grouping the voltage data of the plurality of leads into a plurality of subsets.

In some embodiments, such methods further comprise receiving demographic information of the subject, wherein generating the feature vector comprises adding the demographic information to the feature vector. In some such embodiments, the method further comprises receiving genomic information of the subject. Generating the feature vector may comprise adding the genomic information to the feature vector. Without being bound by any particular methodology or theory, said genomic data may be derived from a biological sample that is derived from a hereditary ATTR patient carrying a mutation. Such mutations are known in the art and may include, without limitation or exclusion, mutations V30M, Y114C, G47R, S50I, T49S, F33V, A45T, E89K, E89Q and V122I. In some such embodiments, the learning system comprises a convolutional neural network. Such convolutional neural networks may comprise at least one residual connection.

In some embodiments the voltage-time data of a subject is received from an electrocardiograph. In further embodiments, the voltage-time data of a subject is received from an electronic medical record.

In some embodiments, the method further comprises providing the indication to an electronic health record system for storage in a health record associated with the subject. In some embodiments, the method further comprises providing the indication to a computing node for display to a user.

In some embodiments of the methods disclosed herein, the feature vector comprises a matrix having a plurality of rows and a plurality of columns, the plurality of rows corresponding to a temporal dimension and the plurality of columns corresponding to a spatial dimension. In some such embodiments, each of the plurality of rows correspond to one of the plurality of leads and each of the plurality of columns corresponds to a timestamp. In some embodiments, the temporal dimension has a resolution of 500 Hz. The convolutional neural network disclosed herein may comprise at least nine convolutional blocks and two fully connected blocks.

Figure 1:
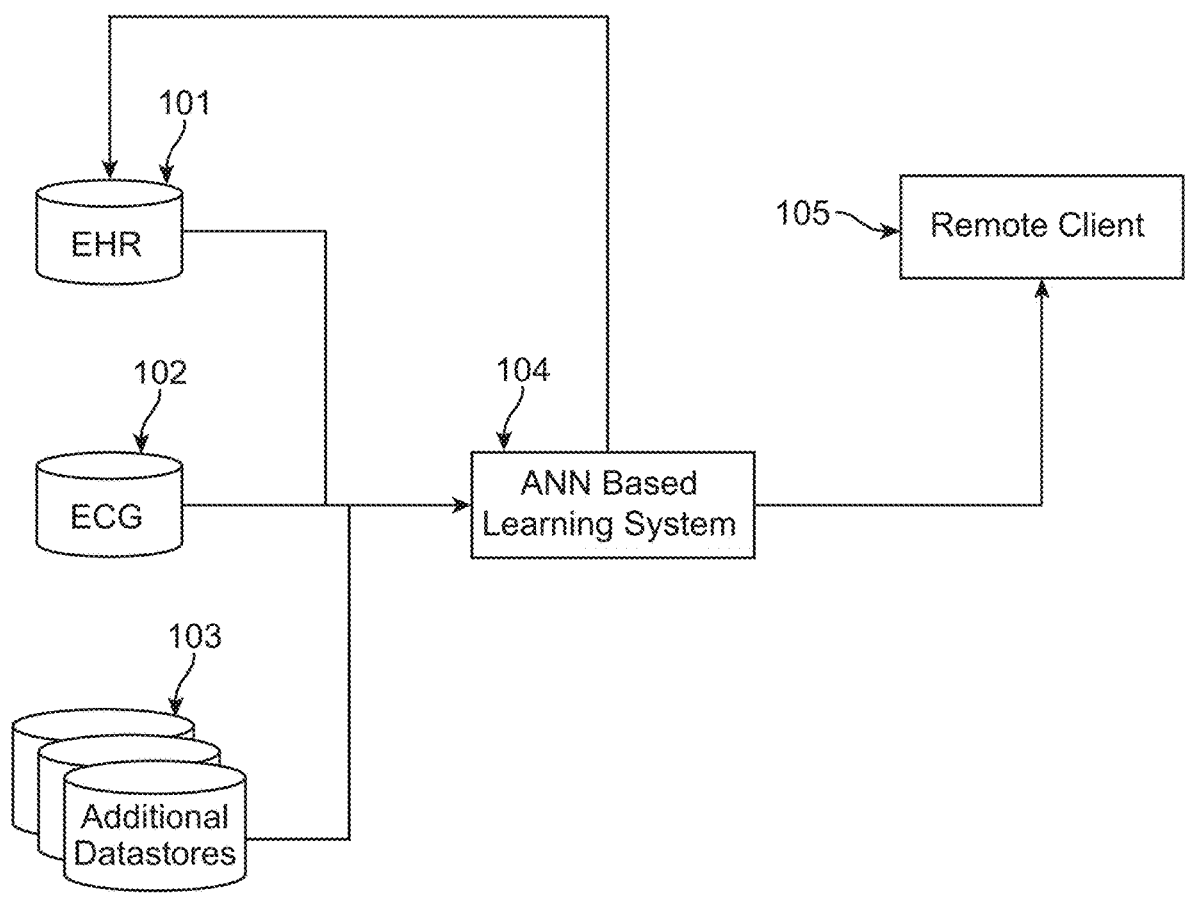
FIG. 1 is an exemplary embodiment of a schematic view of a system for detecting CA according to embodiments of the present disclosure.

With reference now to FIG. 1, a system for detecting cardiac amyloidosis is illustrated according to embodiments of the present disclosure. As outlined above, in various embodiments, patient information, including electrocardiogram (ECG) data, is provided to a learning system in order to determine the presence of cardiac amyloidosis. Thus, aspects of the invention, as disclosed herein, also include a system comprising: an electrocardiograph comprising a plurality of leads; a computing node comprising a computer readable storage medium having program instructions embodied therewith, the program instructions executable by a processor of the computing node to cause the processor to perform a method comprising: receiving voltage-time data of a subject from the echocardiograph, the voltage-time data comprising voltage data of the plurality of leads; generating a feature vector from the voltage-time data; providing the feature vector to a pretrained learning system; and receiving from the pretrained learning system an indication of the presence or absence of cardiac amyloidosis in the subject. Generating the feature vector may comprise generating a spectrogram based on the voltage data of the plurality of leads. In some embodiments generating the feature vector comprises grouping the voltage data of the plurality of leads into a plurality of subsets.

With continued reference to FIG. 1, such systems further comprise receiving demographic information of the subject, wherein generating the feature vector comprises adding the demographic information to the feature vector. In some such embodiments, the system further comprises receiving genomic information of the subject. Generating the feature vector may comprise adding the genomic information to the feature vector. Without being bound by any particular methodology or theory, said genomic data may be derived from a biological sample that is derived from a hereditary ATTR patient carrying a mutation. Such mutations are known in the art and may include, without limitation or exclusion, mutations V30M, Yl 14C, G47R, S50I, T49S, F33V, A45T, E89K, E89Q and V122I. In some such embodiments, the learning system comprises a convolutional neural network. Such convolutional neural networks may comprise at least one residual connection.

With continued reference to FIG. 1, the voltage-time data of a subject is received from an electrocardiograph. In further embodiments, the voltage-time data of a subject is received from an electronic medical record.

With continued reference to FIG. 1, the system may further comprises providing the indication to an electronic health record system for storage in a health record associated with the subject. In some embodiments, the system further comprises providing the indication to a computing node for display to a user.

With continued reference to FIG. 1, the feature vector comprises a matrix having a plurality of rows and a plurality of columns, the plurality of rows corresponding to a temporal dimension and the plurality of columns corresponding to a spatial dimension. In some such embodiments, each of the plurality of columns correspond to one of the plurality of leads and each of the plurality of columns corresponds to a timestamp. In some embodiments, the temporal dimension has a resolution of 500 Hz. In some embodiments, the convolutional neural network comprises at least nine convolutional blocks and two fully connected blocks.

With continued reference to FIG. 1, patient data may be received from electronic health record (EHR) 101. An electronic health record (EHR), or electronic medical record (EMR), may refer to the systematized collection of patient and population electronically-stored health information in a digital format. These records can be shared across different health care settings. Records may be shared through network-connected, enterprise-wide information systems or other information networks and exchanges. EHRs may include a range of data, including demographics, medical history, medication and allergies, immunization status, laboratory test results, radiology images, vital signs, personal statistics like age and weight, and billing information. EHR systems may be designed to store data and capture the state of a patient across time. In this way, the need to track down a patient's previous paper medical records is eliminated.

With continued reference to FIG. 1, electrocardiogram (ECG) data may be received directly from an electrocardiography device 102. In an exemplary 12-lead ECG, ten electrodes are placed on the patient's limbs and on the surface of the chest. The overall magnitude of the heart's electrical potential is then measured from twelve different angles (leads) and is recorded over a period of time (usually ten seconds). In this way, the overall magnitude and direction of the heart's electrical depolarization is captured at each moment throughout the cardiac cycle.

With continued reference to FIG. 1, additional datastores 103, may include further patient information as set out herein. Suitable datastores include databases, flat files, and other structures known in the art. In an embodiment, it may be appreciated that ECG data may be stored in an EHR for later retrieval. It will also be appreciated that ECG data may be cached, rather than delivered directly to a learning system for further processing.

With continued reference to FIG. 1, learning system 104 receives patient information from one or more of EHR 101, ECG 102, and additional datastores 103. As set out above, in some embodiments, the learning system comprises a convolutional neural network. In various embodiments, the input to the convolutional neural network comprises voltage-time information an ECG, which in some embodiments is paired with additional patient information such as demographics or genetic information.

With continued reference to FIG. 1, learning system 104 may be pretrained using suitable population data as set out in the examples in order to produce an indication of the presence or absence of cardiac amyloidosis. In some embodiments, the indication is binary. In some embodiments, the indication is a probability value, indicating the likelihood of cardiac amyloidosis given the input patient data.

With continued reference to FIG. 1, learning system 104 provides the indication of cardiac amyloidosis for storage as part of an EHR. In this way, a computer-aided diagnosis is provided, which may be referred to by a clinician. In some embodiments, learning system 104 provides the indication of cardiac amyloidosis to a remote client 105. For example, a remote client may be a health app, a cloud service, or another consumer of diagnostic data. In some embodiments, the learning system 104 is integrated into an ECG machine for immediate feedback to a user during testing.

With continued reference to FIG. 1, a feature vector is provided to a learning system. Based on the input features, the learning system generates one or more outputs. In some embodiments, the output of the learning system is a feature vector.

With continued reference to FIG. 1, the learning system comprises a SVM. In other embodiments, the learning system comprises an artificial neural network. In some embodiments, the learning system is pre-trained using training data. In some embodiments training data is retrospective data. In some embodiments, the retrospective data is stored in a data store. In some embodiments, the learning system may be additionally trained through manual curation of previously generated outputs.

With continued reference to FIG. 1, the learning system, is a trained classifier. In some embodiments, the trained classifier is a random decision forest. However, it will be appreciated that a variety of other classifiers are suitable for use according to the present disclosure, including linear classifiers, support vector machines (SVM), or neural networks such as recurrent neural networks (RNN).

With continued reference to FIG. 1, suitable artificial neural networks include but are not limited to a feedforward neural network, a radial basis function network, a self-organizing map, learning vector quantization, a recurrent neural network, a Hopfield network, a Boltzmann machine, an echo state network, long short term memory, a bi-directional recurrent neural network, a hierarchical recurrent neural network, a stochastic neural network, a modular neural network, an associative neural network, a deep neural network, a deep belief network, a convolutional neural networks, a convolutional deep belief network, a large memory storage and retrieval neural network, a deep Boltzmann machine, a deep stacking network, a tensor deep stacking network, a spike and slab restricted Boltzmann machine, a compound hierarchical-deep model, a deep coding network, a multilayer kernel machine, or a deep Q-network.

With continued reference to FIG. 1, in machine learning, a convolutional neural network (CNN) is a class of feed-forward artificial neural networks applicable to analyzing visual imagery and other natural signals. A CNN consists of an input and an output layer, as well as multiple hidden layers. The hidden layers of a CNN typically consist of convolutional layers, pooling layers, fully connected layers and normalization layers. Convolutional layers apply a convolution operation to the input, passing the result to the next layer. The convolution emulates the response of an individual neuron to stimuli. Each convolutional neuron processes data only for its receptive field.

With continued reference to FIG. 1, a convolution operation, allows a reduction in free parameters as compared to a fully connected feed forward network. In particular, tiling a given kernel allows a fixed number of parameters to be learned irrespective of image size. This likewise reduces the memory footprint for a given network.

A convolutional layer's parameters consist of a set of learnable filters (or kernels), which have a small receptive field, but extend through the full depth of the input volume. During the forward pass, each filter is convolved across the width and height of the input volume, computing the dot product between the entries of the filter and the input and producing a 2-dimensional activation map of that filter. As a result, the network learns filters that activate when it detects some specific type of feature at some spatial position in the input.

With continued reference to FIG. 1, in an exemplary convolution, a kernel comprises a plurality of weights $w_1 \ldots w_9$. It will be appreciated that the sizes provided here are merely exemplary, and that any kernel dimension may be used as described herein. The kernel is applied to each tile of an input (e.g., an image). The result of each tile is an element of a feature map. It will be appreciated that a plurality of kernels may be applied to the same input in order to generate multiple feature maps.

With continued reference to FIG. 1, stacking the feature maps for all kernels forms a full output volume of the convolution layer. Every entry in the output volume can thus also be interpreted as an output of a neuron that looks at a small region in the input and shares parameters with neurons in the same feature map.

With continued reference to FIG. 1, Convolutional neural networks may be implemented in various hardware, including hardware CNN accelerators and GPUs.

Figure 2:
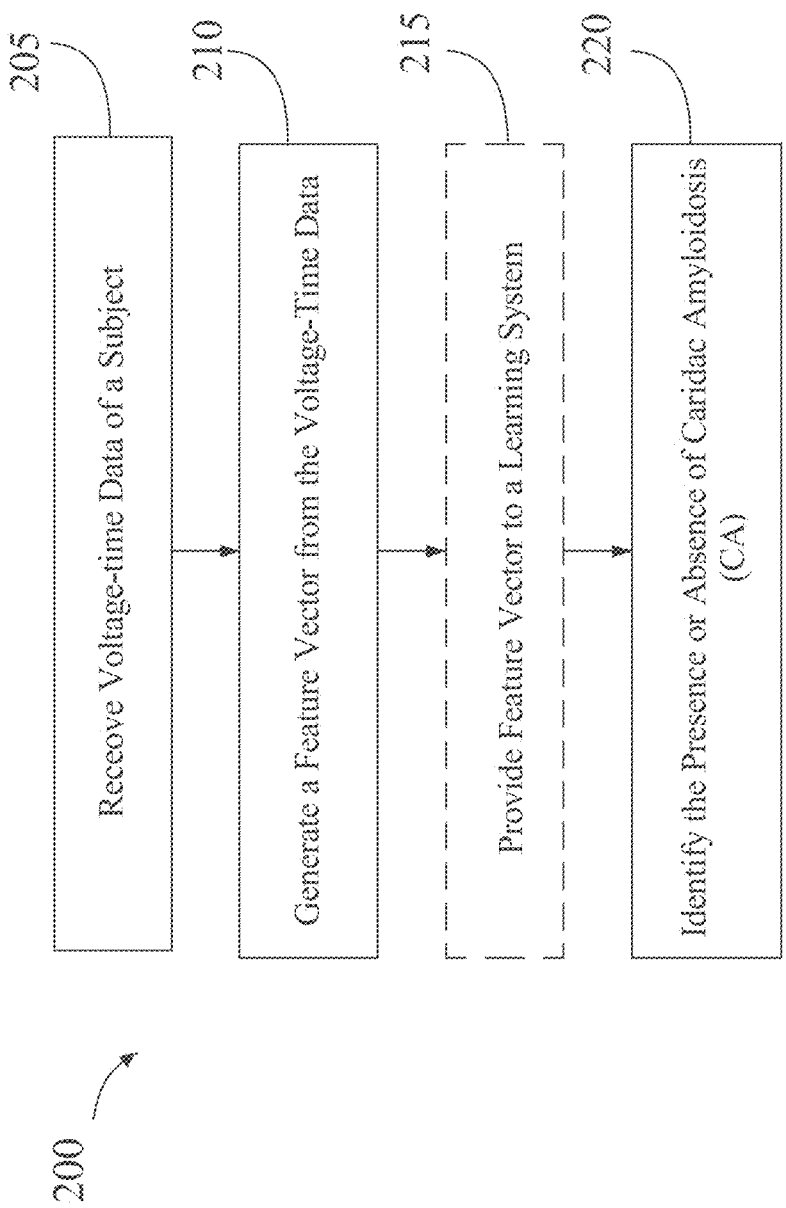
FIG. 2 is a flow diagram of an exemplary method of detecting cardiac amyloidosis according to embodiments of the present disclosure.

Referring now to FIG. 2, a flowchart is provided illustrating a method of detecting cardiac amyloidosis according to embodiments of the present disclosure. At step 205, the method includes receiving, using at least a processor, voltage-time data of a subject, wherein the voltage-time data comprises voltage data from a plurality of leads of an electrocardiograph. The voltage-time data may include voltage data of a plurality of leads of an electrocardiograph. In an embodiment, the voltage-time data of a subject may be received from an electrocardiograph and/or an electronic medical record.

With continued reference to FIG. 2, at step 210, the method includes generating, using the at least a processor, a feature vector from the voltage-time data. In an embodiment, the method may include generating the feature vector comprises generating a spectrogram based on the voltage data of the plurality of leads. In another embodiment, the method may include generating the feature vector comprises grouping the voltage data of the plurality of leads into a plurality of subsets. In an embodiment, the method may include receiving, using the at least a processor, demographic data and/or genomic data associated with the subject. The method may include generating, using the at least a processor, the feature vector as a function of the demographic data and/or genomic data and the voltage-time data. In a fourth embodiment, the feature vector may include a matrix, wherein the matrix may include a plurality of rows corresponding to a temporal dimension and a plurality of columns corresponding to a spatial dimension. In some cases, each row of the plurality of rows may correspond to at least one lead of the plurality of leads. In other cases, each column of the plurality of columns may correspond to at least one timestamp.

With continued reference to FIG. 2, at step 215, the method may include providing the feature vector to a pretrained learning system.

With continued reference to FIG. 2, at step 220, the method includes identifying, using the at least a processor, the presence or absence of cardiac amyloidosis (CA) in the subject as a function of the feature vector using a learning system.

Figure 3:
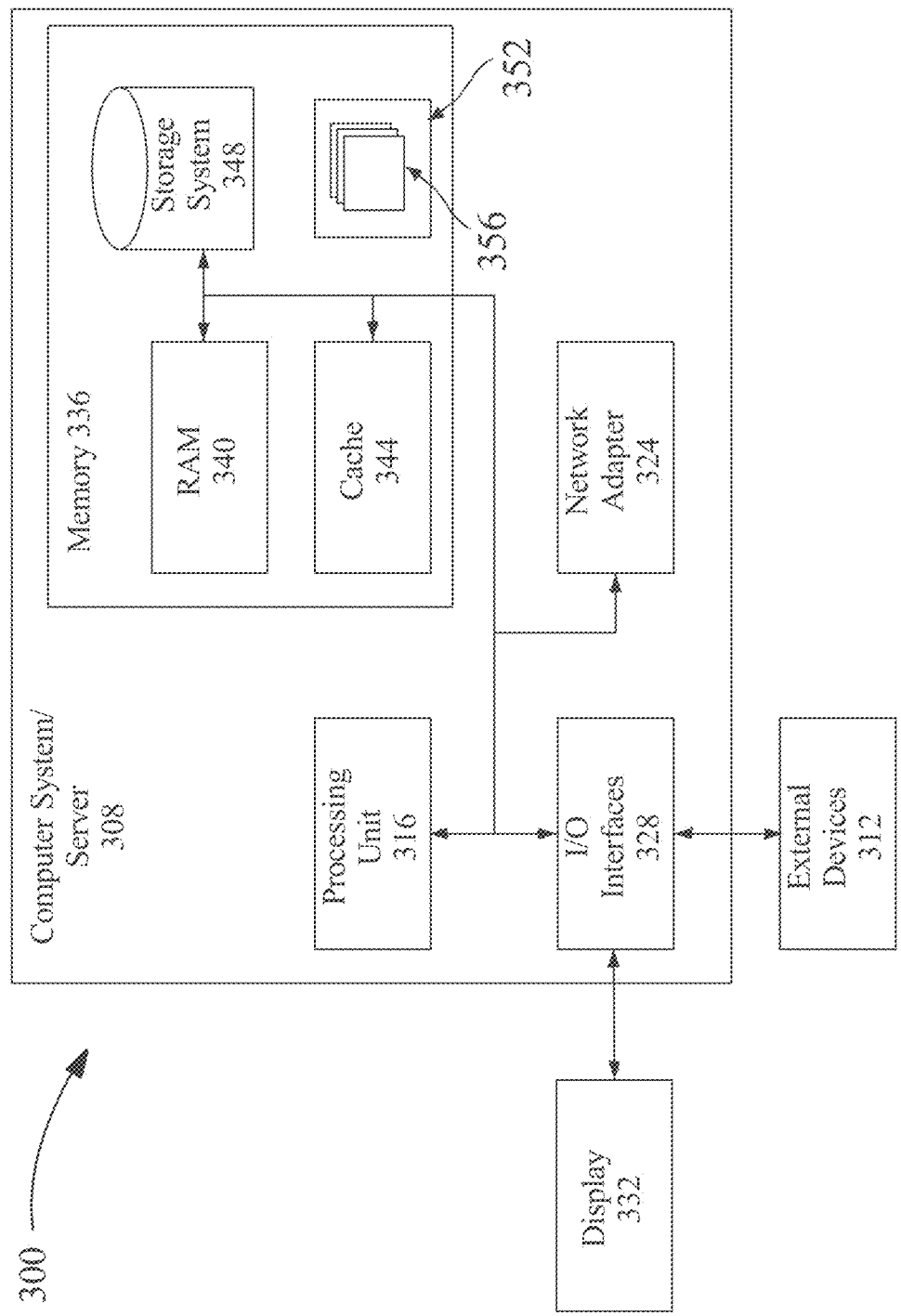
FIG. 3 is an exemplary embodiment of a computing node according to an embodiment of the present disclosure.

Referring now to FIG. 3, a schematic of an example of a computing node is shown. Computing node 304 is only one example of a suitable computing node and is not intended to suggest any limitation as to the scope of use or functionality of embodiments described herein. Regardless, computing node 304 is capable of being implemented and/or performing any of the functionality set forth hereinabove.

With continued reference to FIG. 3, in computing node 304 there is a computer system/server 308, which is operational with numerous other general purpose or special purpose computing system environments or configurations. Examples of well-known computing systems, environments, and/or configurations that may be suitable for use with computer system/server 308 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

With continued reference to FIG. 3, computer system/server 308 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 308 may be practiced in distributed cloud computing environments where tasks are performed by remote processing devices that are linked through a communications network. In a distributed cloud computing environment, program modules may be located in both local and remote computer system storage media including memory storage devices.

With continued reference to FIG. 3, computer system/server 308 in computing node 304 is shown in the form of a general-purpose computing device. The components of computer system/server 308 may include, but are not limited to, one or more processors or processing units 316, a system memory 336, and a bus 320 that couples various system components including system memory 336 to processor 316.

With continued reference to FIG. 3, bus 320 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, Peripheral Component Interconnect (PCI) bus, Peripheral Component Interconnect Express (PCie), and Advanced Microcontroller Bus Architecture (AMBA).

With continued reference to FIG. 3, computer system/server 308 typically includes a variety of computer system readable media. Such media may be any available media that is accessible by computer system/server 308, and it includes both volatile and non-volatile media, removable and non-removable media.

With continued reference to FIG. 3, system memory 336 can include computer system readable media in the form of volatile memory, such as random access memory (RAM) 340 and/or cache memory 344. Computer system/server 308 may further include other removable/non-removable, volatile/non-volatile computer system storage media. By way of example only, storage system 348 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 320 by one or more data media interfaces. As will be further depicted and described below, memory 336 may include at least one program product having a set (e.g., at least one) of program modules that are configured to carry out the functions of embodiments of the disclosure.

With continued reference to FIG. 3, program/utility 352, having a set (at least one) of program modules 356, may be stored in memory 336 by way of example, and not limitation, as well as an operating system, one or more application programs, other program modules, and program data. Each of the operating system, one or more application programs, other program modules, and program data or some combination thereof, may include an implementation of a networking environment. Program modules 356 generally carry out the functions and/or methodologies of embodiments as described herein.

With continued reference to FIG. 3, computer system/server 308 may also communicate with one or more external devices 312 such as a keyboard, a pointing device, a display 332, etc.; one or more devices that enable a user to interact with computer system/server 308; and/or any devices (e.g., network card, modem, etc.) that enable computer system/server 308 to communicate with one or more other computing devices. Such communication can occur via Input/Output (1/0) interfaces 328. Still yet, computer system/server 308 can communicate with one or more networks such as a local area network (LAN), a general wide area network (WAN), and/or a public network (e.g., the Internet) via network adapter 324. As depicted, network adapter 324 communicates with the other components of computer system/server 308 via bus 320. It should be understood that although not shown, other hardware and/or software components could be used in conjunction with computer system/server 308. Examples, include, but are not limited to: microcode, device drivers, redundant processing units, external disk drive arrays, RAID systems, tape drives, and data archival storage systems, etc.

The present disclosure may be embodied as a system, a method, and/or a computer program product. For example, in some aspects or the invention, provided herein is a computer program product for detection of cardiac amyloidosis, the computer program product comprising a computer readable storage medium having program instructions embodied therewith, the program instructions executable by a processor to cause the processor to perform a method comprising: receiving voltage-time data of a subject from the echocardiograph, the voltage-time data comprising voltage data of the plurality of leads; generating a feature vector from the voltage-time data; providing the feature vector to a pretrained learning system; and receiving from the pretrained learning system an indication of the presence or absence of cardiac amyloidosis in the subject. Generating the feature vector may comprise generating a spectrogram based on the voltage data of the plurality of leads. In some embodiments generating the feature vector comprises grouping the voltage data of the plurality of leads into a plurality of subsets.

In some embodiments, such computer program products further comprise receiving demographic information of the subject, wherein generating the feature vector comprises adding the demographic information to the feature vector. In some such embodiments, the computer program further comprises receiving genomic information of the subject. Generating the feature vector may comprise adding the genomic information to the feature vector. Without being bound by any particular methodology or theory, said genomic data may be derived from a biological sample that is derived from a hereditary ATTR patient carrying a mutation. Such mutations are known in the art and may include, without limitation or exclusion, mutations V30M, Y1 14C, G47R, S50I, T49S, F33V, A45T, E89K, E89Q and V122I. In some such embodiments, the computer program product comprises a convolutional neural network. Such convolutional neural networks may comprise at least one residual connection.

In some embodiments the voltage-time data of a subject is received from an electrocardiograph. In further embodiments, the voltage-time data of a subject is received from an electronic medical record.

In some embodiments, the computer program product further comprises providing the indication to an electronic health record system for storage in a health record associated with the subject. In some embodiments, the computer program product further comprises providing the indication to a computing node for display to a user.

In some embodiments of the computer program product disclosed herein, the feature vector may comprise a matrix having a plurality of rows and a plurality of columns, the plurality of rows corresponding to a temporal dimension and the plurality of columns corresponding to a spatial dimension. In some such embodiments, each of the plurality of columns correspond to one of the plurality of leads and each of the plurality of columns corresponds to a timestamp. In some embodiments, the temporal dimension has a resolution of 500 Hz. In some embodiments, the convolutional neural network comprises at least nine convolutional blocks and two fully connected blocks.

The computer program product provided herein may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

EXAMPLES

Example 1: Methods

Data Sources and Study Population: The CA cohort consisted of 2541 patients seen at Mayo Clinic from Jan. 1, 2000, through May 31, 2019, identified from the institutional amyloid database. Inclusion criteria included a diagnosis of ATTR or AL with cardiac involvement and a digital 12-lead ECG within 180 days of diagnosis. The diagnosis of AL required biopsy (cardiac or noncardiac) with positive staining for amyloid and typing with immunohistochemistry, immunofluorescence, or laser micro dissection mass spectrometry[13]; ATTR was diagnosed on the basis of either a tissue diagnosis or abnormality detected on technetium Tc 99m pyrophosphate scintigraphy in the absence of evidence of AL amyloidosis.[14] For AL and ATTRv, cardiac involvement was defined as any of the following: an interventricular septal thickness of more than 12 mm, troponin T level above 0.03 ng/L or N-terminal proeB-type natriuretic peptide level above 332 pg/mL, or any cardiac symptom not attributable to other cardiac conditions. All patients with ATTRwt were considered to have cardiac involvement. Exclusion criteria included normal findings on endomyocardial biopsy, transthoracic echocardiography interpreted as negative for cardiac amyloid, and ventricular pacing at the time of ECG acquisition. Controls were selected from the Mayo Clinic practice who were not present in the amyloid cohort and had at least 1 digital 12-lead ECG performed within 180 days of transthoracic echocardiography. Controls with an echocardiogram interpreted as consistent with amyloidosis or infiltrative cardiomyopathy were excluded. Patients with prior cardiovascular surgery, inadequately reported ECGs and echocardiograms, ECGs with invalid waveforms or ventricular pacing, and left ventricular ejection fraction below 50% were excluded from the control group. Cases and controls were matched using a nearest neighbors algorithm on age and sex in a 1:1 ratio. The ECGs in both the amyloid and control groups were digital, standard, 10-second, 12-lead ECGs acquired in the supine position. In addition to the 12-lead ECG, single-lead and 6-lead ECG tracings were acquired.

Model Development: Three data sets-training (n=2997; 60%), validation (n¼4999; 20%), and testing (n=999; 20%)—were prepared by assigning cases and controls through outcome-stratified random sampling. These proportions were chosen to ensure an adequate number of cases in the subsets, and each patient was uniquely assigned to a single group.

Figure 10:
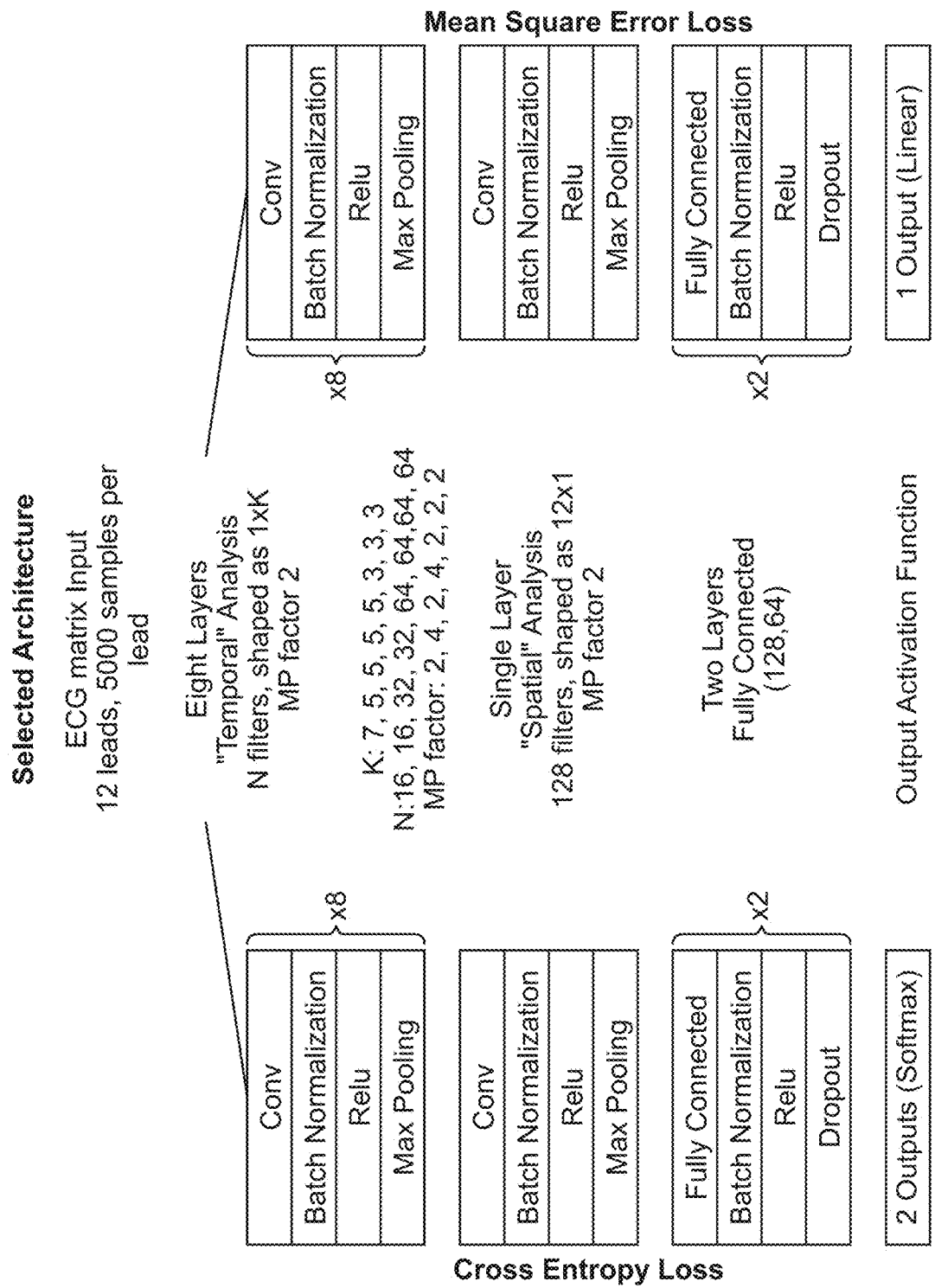
FIG. 10 is an illustration of an exemplary embodiment of a model architecture employed with inputs consisting of raw ECG waveform data and a binary output predicting the presence or absence of CA.

The model architecture employed is illustrated in FIG. 10, with inputs consisting of raw ECG waveform data and a binary output predicting the presence or absence of CA. It should be noted that only raw data were used, no manually extracted features.

We implemented a convolutional neural network (CNN) using the Keras Framework with a Tensorflow (Google, Mountain View, CA) backend and Python. While CNNs are mainly applied to images, we adjusted the network architecture to have spatial and temporal feature extraction layers. The network operates by adjusting the weights of the convolutional filters during training to extract meaningful and relevant features in an unsupervised way. The network was built using stacked blocks of convolutional, max pooling, and batch normalization; each block was followed by a nonlinear activation function. After the first group of blocks extracted temporal features, another spatial block was used to fuse data from all leads, and then the extracted features were used in a fully connected network. Of note, the only data inputted for training were the raw digital 12-lead ECG signal and the associated classification of each individual. FIG. 10 summarizes the network architecture for an exemplary network. Hyperparameters (batch size, initial learning rate, number of neurons in the fully connected layers, and number of convolutional layers) were changed during training to get the optimal model based on the validation set.

Although initial experiments were conducted using transfer learning, whereby the weights of the preexisting network were either updated very slowly or frozen entirely, the best performance was found by retraining from scratch. Training consisted of runs of 30 epochs with a batch size of 32 and a learning rate of 0.001. A categorical cross-entropy loss was used on one-hot encoded labels of either ATTR or AL as the positive case and no-amyloid as the negative case. The optimizer was Adam and the final layer activation was softmax.[16] Alternative combinations of batch size and learning rate were systematically assessed using the validation set with the ones reported here having the highest performance. During training, after each epoch, the network was evaluated on the validation set and the area under the receiver operating characteristic curve (AUC) recorded. At the end of 30 epochs, the model with the highest validation set AUC was selected as optimal and evaluated on the test set.

To classify a given patient, we compared the output probability to a threshold that can be tuned to different clinical scenarios, for example, emphasizing sensitivity over specificity. Our primary analysis tuned the threshold toward a balance between the 2 by selecting the point on the validation set receiver operating characteristic curve with the highest Youden index[17] and designating the corresponding threshold as optimal. The single-lead and 6-lead models were developed using a similar architecture but with adapted layer shapes.

Main Analysis: AI-Enabled ECG to Detect CA: Model efficacy at detecting CA was assessed using the closest 12-lead ECG within 180 days of the diagnosis date. The performance in differentiating patients with CA from non-amyloid controls was evaluated by use of a receiver operating characteristic curve, with sensitivity and specificity evaluated at 2 thresholds, one favoring higher sensitivity and a second determined by maximizing the Youden index. Secondary analysis was performed with single-lead and six-lead tracings.

Subgroup Analysis: The performance of the model was assessed in subsets of patients according to age, sex, and amyloid subtype (AL, ATTRwt, and ATTRv) and in those satisfying electrocardiographic criteria for low voltage, LVH, or a "normal" ECG. In addition, the baseline comorbidities and 12-lead ECG findings in patients with CA and controls was reported. Categorical variables are reported as absolute numbers and percentages, and continuous variables are reported as mean with standard deviation. Categorical variables were compared with c2 test, and continuous variables were compared using Student t-test. Statistical analyses were performed using the R software package v3.6.2,[18] and model development was performed using TensorFlow 2.1.0 and Python 3.7.7. AP value of less than 0.005 was considered significant.

Temporal Analysis: A temporal analysis was performed to assess the ability of the model to detect CA before the clinical diagnosis date. For each patient with CA, all available ECGs recorded between 6 months and 5 years before diagnosis was retrieved. The model output of probability of amyloid was recorded for each tracing, and the time between acquisition and the diagnosis date was recorded. The distribution of amyloid probability over time was assessed by violin plots. For patients with multiple ECGs within a given time bin, the median predicted amyloid probability score was used.

Example 2: Results

Study Population: Baseline characteristics, comorbidities, and 12-lead ECG findings at diagnosis are outlined in Tables 1 to 4. The patients with ATTRwt were almost exclusively male and older than 60 years. Patients with CA more commonly had 12-lead ECG abnormalities compared with controls in all categories except for left bundle branch block and QT interval prolongation. Atrial arrhythmias and conduction system disease were more common in ATTRwt than in AL, whereas low-voltage ECG was more common in AL. Criteria for LVH were present in almost 20% of patients with ATTRwt. The ECG characteristics between training, test, and validation sets were comparable (Table 4).

TABLE 1

Baseline Characteristics and Comorbidities: Amyloid and Control

|  | AL | ATTRwt | All amyloid | Control |
|---|---|---|---|---|
| No. | 1839 | 530 | 2541 | 2454 |
| Male | 1189 (64.8) | 493 (93.0) | 1821 (71.7) | 1758 (71.9) |
| Age > 60 years | 1139 (61.9) | 519 (97.9) | 1776 (69.9) | 1710 (69.7) |
| White | 1545 (93.4) | 487 (97.2) | 2131 (92.1) | 2144 (94.3) |
| Hypertension | 326 (17.7) | 199 (37.5) | 544 (21.4) | 988 (40.3) |
| Diabetes | 85 (4.6) | 65 (12.3) | 154 (6.1) | 374 (15.2) |
| Congestive heart failure | 650 (35.3) | 309 (58.3) | 1028 (40.5) | 357 (14.5) |
| Myocardial infarction | 37 (2.0) | 43 (8.1) | 83 (3.3) | 200 (8.1) |
| Chronic pulmonary disease | 114 (6.2) | 64 (12.1) | 182 (7.2) | 380 (15.5) |
| Renal disease | 211 (11.5) | 75 (14.2) | 291 (11.5) | 195 (7.9) |

AL, light chain amyloid; ATTRwt, wild-type transthyretin amyloid.
Values are reported as number (%).

TABLE 2

Baseline Characteristics and Comorbidities: Training, Test, and Validation Cohorts

|  | Training | | Test | | Validation | |
|---|---|---|---|---|---|---|
|  | Amyloid | Control | Amyloid | Control | Amyloid | Control |
| No. | 1525 | 1472 | 508 | 491 | 508 | 491 |
| Male | 1101 (72.3) | 1060 (72.3) | 373 (73.6) | 365 (74.3) | 347 (68.3) | 333 (68.4) |
| Age >60 years | 1059 (69.4) | 1039 (70.6) | 346 (68.1) | 332 (67.6) | 371 (73.0) | 339 (69.0) |
| White | 1268 (91.7) | 1291 (94.3) | 431 (93.5) | 428 (94.9) | 432 (91.7) | 425 (93.8) |
| Hypertension | 334 (21.9) | 584 (39.7) | 107 (21.1) | 193 (39.3) | 103 (20.3) | 211 (43.0) |
| Diabetes | 99 (6.5) | 223 (15.1) | 31 (6.1) | 67 (13.6) | 24 (4.7) | 84 (17.1) |
| Congestive heart failure | 612 (40.1) | 221 (15.0) | 200 (39.4) | 68 (13.8) | 216 (42.5) | 68 (13.8) |
| Myocardial infarction | 41 (2.7) | 119 (8.1) | 23 (4.5) | 42 (8.6) | 19 (3.7) | 39 (7.9) |
| Chronic pulmonary disease | 115 (7.5) | 234 (15.9) | 27 (5.3) | 70 (14.3) | 40 (7.9) | 76 (15.5) |
| Renal disease | 192 (12.6) | 120 (8.2) | 44 (8.7) | 27 (5.5) | 55 (10.8) | 48 (9.8) |

Values are reported as number(%).

TABLE 3

| Baseline 12-Lead ECG Findings [a,b] | | | | | | |
|---|---|---|---|---|---|---|
| | AL | ATTRwt | P value [c] | All amyloid | Control | P value [d] |
| | 1839 | 530 | | 2541 | 2454 | |
| Sinus rhythm | 1687 (91.7) | 316 (59.6) | <.001 | 2151 (84.7) | 2157 (87.9) | .001 |
| Atrial fibrillation or flutter | 108 (5.9) | 193 (36.4) | <.001 | 321 (12.6) | 249 (10.1) | .007 |
| First-degree AV block | 381 (20.7) | 165 (31.1) | <.001 | 589 (23.2) | 281 (11.5) | <.001 |
| Right bundle branch block | 131 (7.1) | 110 (20.8) | <.001 | 258 (10.2) | 158 (6.4) | <.001 |
| Left bundle branch block | 37 (2.0) | 41 (7.7) | <.001 | 88 (3.5) | 85 (3.5) | .94 |
| Prolonged QT | 208 (11.3) | 75 (14.2) | .09 | 303 (11.9) | 105 (4.3) | <.001 |
| Low voltage | 582 (31.6) | 66 (12.5) | <.001 | 675 (26.6) | 110 (4.5) | <.001 |
| LVH | 208 (11.3) | 104 (19.6) | <.001 | 339 (13.3) | 220 (9.0) | <.001 |
| Normal ECG | 108 (5.9) | 12 (2.3) | .001 | 124 (4.9) | 431 (17.6) | <.001 |
| Infarct pattern | 598 (32.5) | 179 (33.8) | .62 | 834 (32.8) | 429 (17.5) | <.001 |

[a] AL, light chain amyloid; ATTRwt, wild-type transthyretin amyloid; AV, atrioventricular; ECG, electrocardiogram; LVH, left ventricular hypertrophy.
[b] Values are reported as number(%).
[c] AL vs ATTRwt.
[d] Amyloid vs control.

TABLE 4

| Baseline 12-Lead ECG Findings by Data Set [a,b] | | | | | | |
|---|---|---|---|---|---|---|
| | Training | | Test | | Validation | |
| | Amyloid | Control | Amyloid | Control | Amyloid | Contro |
| No. | 1525 | 1472 | 508 | 491 | 508 | 491 |
| Sinus rhythm | 1301 (85.3) | 1290 (87.6) | 426 (83.9) | 429 (87.4) | 424 (83.5) | 438 (89.2) |
| Atrial fibrillation or flutter | 185 (12.1) | 151 (10.3) | 71 (14.0) | 54 (11.0) | 65 (12.8) | 44 (9.0) |
| First-degree AV block | 354 (23.2) | 175 (11.9) | 116 (22.8) | 51 (10.4) | 119 (23.4) | 55 (11.2) |
| Right bundle branch block | 145 (9.5) | 96 (6.5) | 55 (10.8) | 28 (5.7) | 58 (11.4) | 34 (6.9) |
| Left bundle branch block | 52 (3.4) | 58 (3.9) | 18 (3.5) | 13 (2.6) | 18 (3.5) | 14 (2.9) |
| Prolonged QT | 200 (13.1) | 56 (3.8) | 49 (9.6) | 20 (4.1) | 54 (10.6) | 29 (5.9) |
| Low voltage | 412 (27.0) | 64 (4.3) | 133 (26.2) | 22 (4.5) | 130 (25.6) | 24 (4.9) |
| LVH | 209 (13.7) | 126 (8.6) | 61 (12.0) | 52 (10.6) | 69 (13.6) | 42 (8.6) |
| Normal ECG | 81 (5.3) | 259 (17.6) | 23 (4.5) | 86 (17.5) | 20 (3.9) | 86 (17.5) |
| Infarct pattern | 504 (33.0) | 268 (18.2) | 163 (32.1) | 79 (16.1) | 167 (32.9) | 82 (16.7) |

[a] AL, light chain amyloid; ATTRwt, wild-type transthyretin amyloid; AV, atrioventricular; ECG, electrocardiogram; LVH, left ventricular hypertrophy.
[b] Values are reported as number(%).

Figure 5:
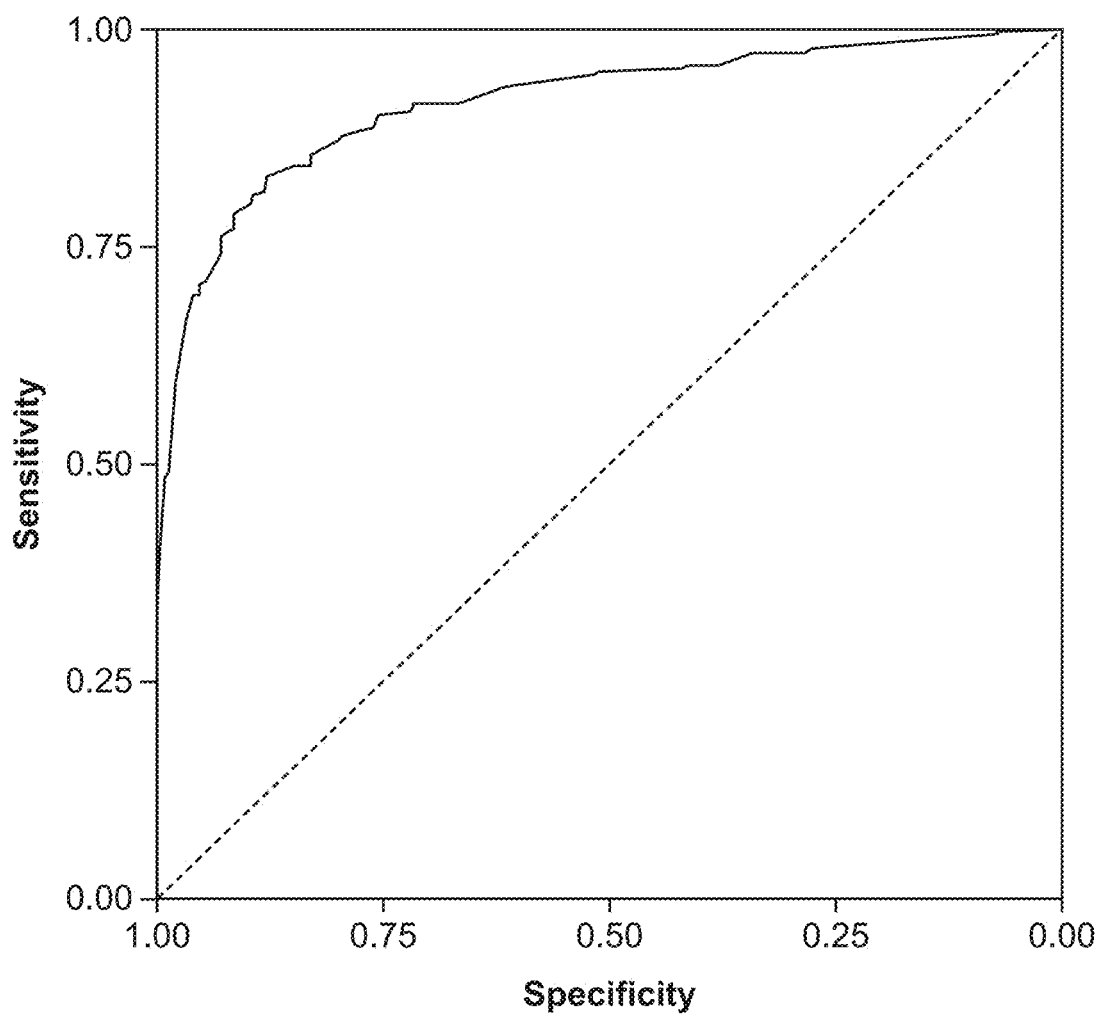
FIG. 5 is a depiction of an exemplary embodiment of a 12-lead model receiver operating characteristic curve.
Figure 6:
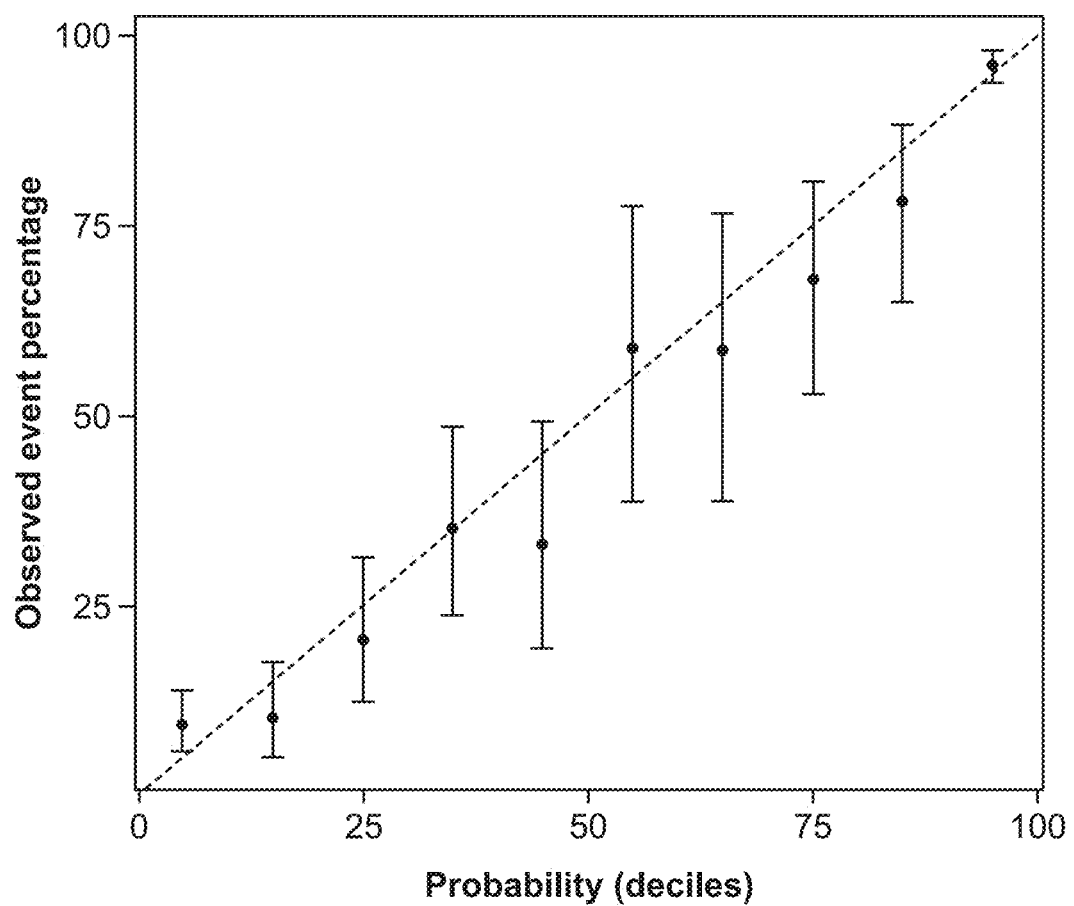
FIG. 6 is a depiction of an exemplary embodiment of a calibration curve, wherein the calibration compares the probability of amyloid that the model predicts (x-axis) with the observed amyloid rate in the population (y-axis).
Figure 7:
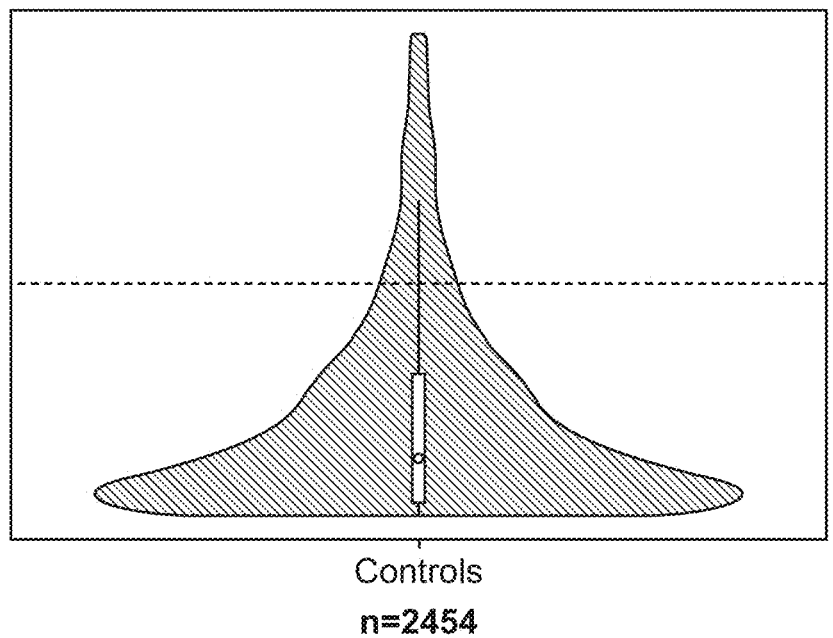
FIG. 7 is a depiction of an exemplary embodiment of a violin plot of predicted amyloid probability in control group.

Model Performance: The test set receiver operating characteristic curve for the 12-lead network is shown in FIG. 5. The AUC of 0.91 (95% CI, 0.90 to 0.93) indicates excellent performance. With use of the optimal probability threshold of 0.485, sensitivity was 0.84 and specificity was 0.85. In this 1:1 matched population, the positive predictive value was 0.86 and the negative predictive value was 0.84. The calibration curve (FIG. 6) shows excellent linearity. Table 5 shows examples of performance at different probability thresholds and prevalence, including the balanced threshold as well as a threshold selected to make the test highly specific. The model prediction of CA probability in the control group is shown as a violin plot in FIG. 7.

TABLE 5

Confusion Matrices for the 12-Lead Model at Different Thresholds and Prevalence

| Scenario | Threshold | Prevalence % | Sensitivity | Specificity | PPV | NPV |
|---|---|---|---|---|---|---|
| 1 | 0.485 | 51 | 81 | 89 | 89 | 82 |
| 2 | 0.485 | 15 | 81 | 89 | 57 | 96 |
| 3 | 0.8 | 51 | 60 | 97 | 95 | 70 |
| 4 | 0.8 | 15 | 60 | 97 | 76 | 93 |
| 5 | 0.8 | 5 | 60 | 97 | 49 | 98 |
| 6 | 0.3 | 5 | 90 | 72 | 15 | 99 |

NPV, negative predictive value; PPV, positive predictive value.

Single-lead and 6-lead model performances were assessed. V5 was the best single-lead model with an AUC of 0.86 and a precision of 0.78, with other single leads performing similarly. The top 6-lead (1, 2, 3, aVR, aVL, aVF) model had an AUC of 0.90 and a precision of 0.85.

Subgroup Analyses: Model performance was similar according to sex and age and across amyloid subtypes (Table 6). Specificity was lower is the presence of low voltage or LVH and less sensitive but highly specific in those with a normal ECG interpretation.

TABLE 6

Test Set Performance by Subgroup With Threshold of 0.486 Chosen by Youden Index

| | No. (%) | AUC | Sensitivity | Specificity |
|---|---|---|---|---|
| All | 999 (100) | 0.91 | 0.84 | 0.85 |
| Male | 738 (74) | 0.91 | 0.84 | 0.83 |
| Female | 261 (26) | 0.94 | 0.82 | 0.93 |
| Age > 60 years | 678 (68) | 0.90 | 0.82 | 0.84 |
| Age: S 60 years | 321 (32) | 0.95 | 0.88 | 0.87 |
| Normal ECG | 109 (11) | 0.74 | 0.35 | 0.99 |
| Low-voltage criteria | 155 (16) | 0.93 | 0.95 | 0.68 |
| LVHby ECG | 113 (11) | 0.86 | 0.85 | 0.67 |
| AL | 351 (35) | 0.92 | 0.84 | 0.85 |
| ATTRv | 34 (3.4) | 0.94 | 0.94 | 0.85 |
| ATTRwt | 123 (12.3) | 0.91 | 0.81 | 0.85 |

AL, light chain amyloid; ATTRv, variant (hereditary) transthyretin amyloid; ATTRwt, wild-type transthyretin amyloid; AUC, area under the receiver operating characteristic curve; ECG, elec- trocardiogram; LVH, left ventricular hypertrophy.

Figure 8A:
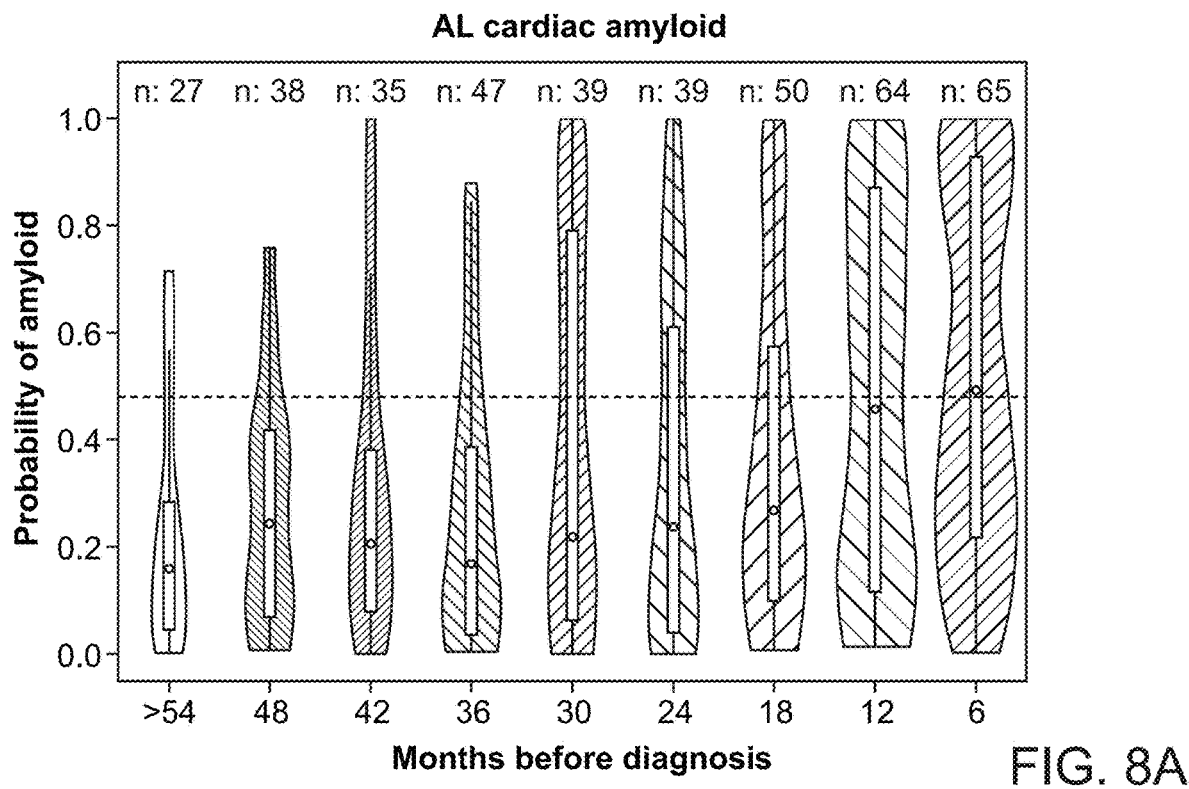
FIGS. 8A-B is a depiction of an exemplary embodiment of violin plots of predicted amyloid probability in patients with cardiac amyloidosis with at least 1 electrocardiogram (ECG) more than 6 months before diagnosis.
Figure 8B:
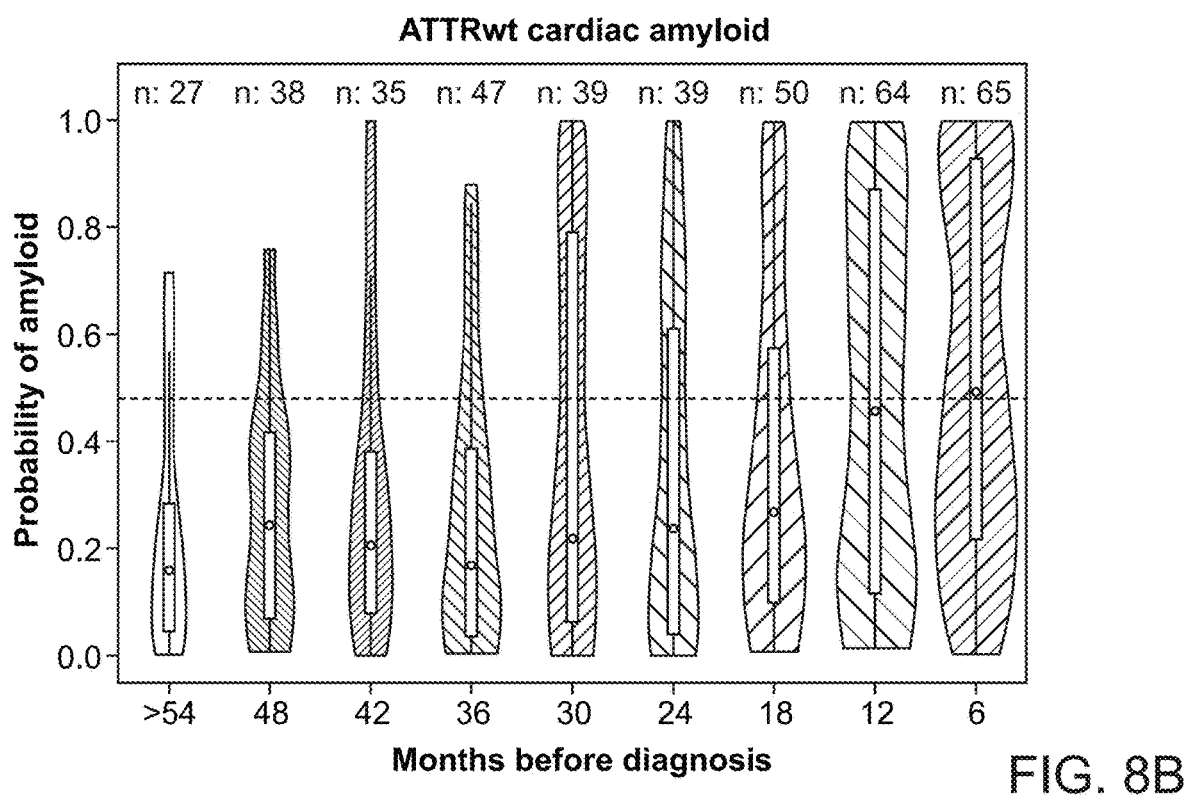
Figure 9A:
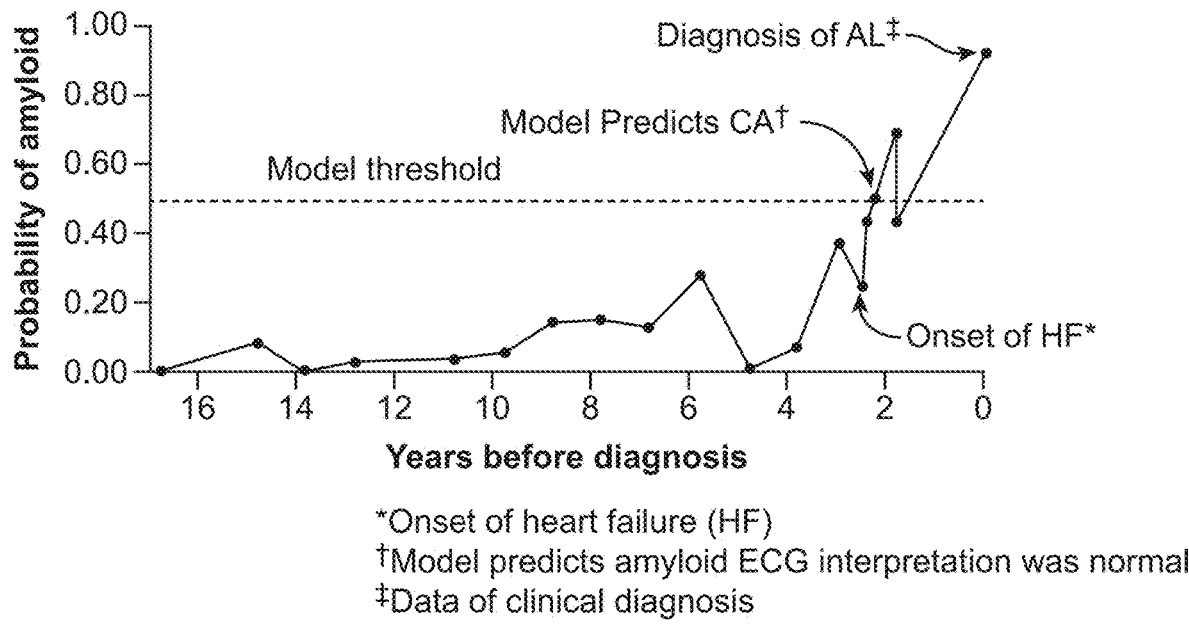
FIGS. 9A-B is a depiction of an exemplary embodiment of an artificial intelligence (AI)-enhanced electrocardiogram (ECG) for the early detection of cardiac amyloidosis (CA).
Figure 9B:
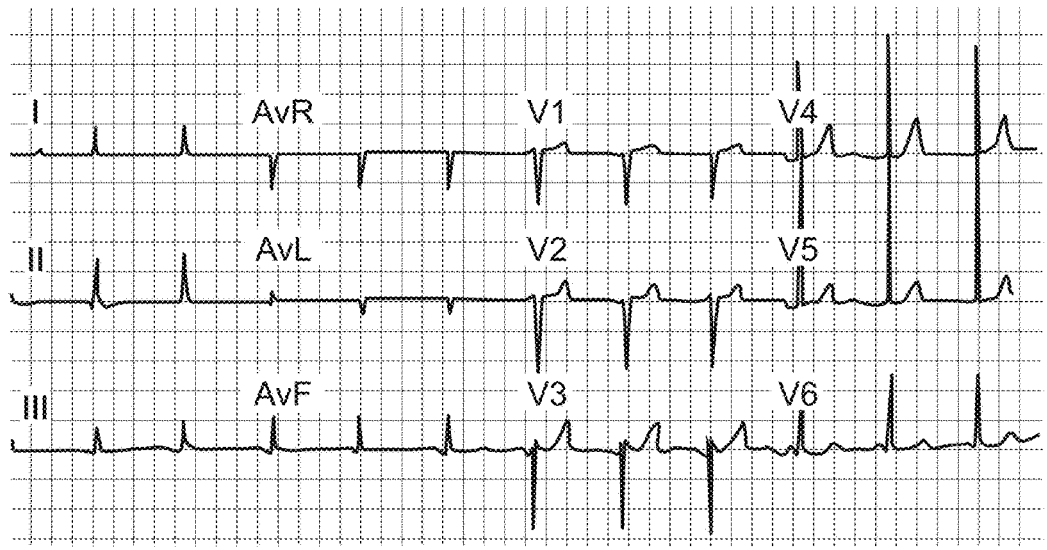

Temporal Analyses: The ECGs were available within a window of 5 years to 6 months before the clinical diagnosis in 396 patients with CA. Of the patients with CA and prediagnosis electrocardiographic studies, the AI model successfully predicted the presence of CA more than 6 months before the clinical diagnosis in 234 (59%), identifying 46% of AL and 70% of ATTRwt. FIG. 8 shows the distribution of amyloid probability over time before diagnosis in 6-month increments in AL and ATTRwt. For patients with AL, approximately half of the patients satisfied the 0.485 threshold 12 months before diagnosis, and for ATTR, the scores were above the median for most patients 48 months before diagnosis. An example of amyloid detection by the AI-ECG model 28 months in advance of the clinical diagnosis of AL amyloidosis is outlined in FIG. 9.

Example 3: Discussion

Amyloid heart disease is associated with high rates of morbidity and mortality, and diagnosis is frequently delayed, resulting in poor outcome.[6] Given the emergence of effective therapies, there is a pressing clinical need for an easy-to-deploy, scalable test for early detection. Because the 12-lead ECG is ubiquitous and inexpensive, it is ideally suited to be transformed into a tool to promote early diagnosis of CA by the addition of AI. There are 4 key findings in this study. First, the AI 12-lead ECG alone can accurately predict CA. Second, the model performed well across amyloid subtypes. Third, in the subset of patients with serial ECGs available, the model was able to predict CA in advance of the clinical diagnosis in almost 60%. Fourth, the tool may be adapted to 6-lead and single-lead ECG acquisitions, allowing point-of-care screening by smartphone-enabled electrodes.

Cardiac amyloidosis has been considered to be a rare disease, although studies suggest that it is underdiagnosed.[6] The true prevalence of CA is unknown but is an area of active investigation. Light chain (AL) amyloidosis still appears to be relatively rare, whereas recent evidence suggests that ATTRwt is probably not rare at all[19]; ATTRwt is present in more than 15% of patients undergoing transcatheter aortic valve replacement[20] and in as many as 13% of patients with heart failure with preserved ejection fraction.[21] The V122I TTR mutation is present in 3% to 4% of Black people in the United States, yielding a population of approximately 1.5 million individuals at risk for CA.[22] Unfortunately, patients with CA are often misdiagnosed with hypertrophic cardiomyopathy, hypertensive heart disease, or other causes of heart failure, resulting in delayed or inappropriate treatment.

The pathophysiologic mechanism of CA is complex and includes not only myocardial infiltration but also direct toxic effects to the heart; thus, the term toxic-infiltrative cardiomyopathy is more accurate.[6] In addition to extracellular infiltration of the myocardium and replacement of cardiac tissue with electrically inert amyloid deposits,[24] circulating light chains in AL amyloidosis cause myocyte dysfunction,[6] and similar toxic effects may occur in ATTR amyloidosis. Myocyte hypertrophy has been reported in ATTRwt amyloidosis,[24] which may explain the finding of electrocardiographic criteria for LVH in almost 20% of these patients.

Because the AI model can detect multiple simultaneous electrocardiographic features, it has the potential to detect these complex physiologic changes early in the disease course. In other conditions, such as ischemia and left ventricular dysfunction, electrical changes are manifested before structural changes are detected by echocardiography and well before the development of symptoms. The excellent performance of the model in both AL and ATTR, despite significant differences in baseline 12-lead characteristics, suggests that the AI model can "see" physiologic changes unique to amyloid that are not appreciated by conventional ECG interpretation.

Advances in noninvasive imaging, including echocardiography and cardiac magnetic resonance imaging, have greatly improved the diagnosis of CA.[14] Echocardiography is a powerful tool to suggest the diagnosis, but differentiation from other causes of increased wall thickness remains challenging. Variations in the extent and distribution of CA may result in non-classic echocardiographic and cardiac magnetic resonance imaging findings,[25] leading to delayed diagnosis. Some patients with AL amyloidosis have normal or only mildly increased wall thickness despite rapidly progressive disease,[26] and establishing the diagnosis even a few months earlier may allow precious time to respond to therapy.

Thus, the key to the diagnosis of CA is a high index of clinical suspicion. Most patients eventually diagnosed with CA have had an ECG performed at some point in their diagnostic journey. As diagnostic algorithms are readily available, the key for the clinician is to consider the diagnosis. Aside from developing a definitive diagnostic test, disclosed herein are methods to harness the data already obtained by electrocardiography. AL and ATTR were included since early diagnosis is important in both, typing is done by other techniques, and the inclusion of ATTR extends the utility of the model to the "not so rare" form of amyloid. The AI model is intended to maximize the diagnostic yield of the ECG, including suggesting a diagnosis not yet considered. The study disclosed herein found that an AI model using the ECG alone can accurately predict CA without requiring other clinical or imaging variables. The accuracy in single-lead and 6-lead acquisitions allows implementation by mobile devices.

Model performance was assessed in different amyloid subtypes and, for the first time, demonstrated the ability of an AI-ECG tool to detect amyloid heart disease before clinical diagnosis. The 12-lead model was extended to single-lead and 6-lead ECG acquisitions, not previously reported.

Using AI-enhanced models of ECG analysis for the detection of low ejection fraction, atrial fibrillation, and hypertrophic cardiomyopathy, an "AI-ECG Dashboard" was created for use within a clinical practice. This tool may be accessed through the electronic medical record and easily integrated into practice. With further validation, the incorporation of the AI-ECG model for detection of CA provides an important new tool to promote timely diagnosis and improved outcomes.

The use of an AI-ECG model may prove useful in determining prognosis, risk of sudden cardiac death, and response to therapy. The model may allow earlier detection of cardiac involvement in ATTRv carriers or in patients with ATTR detected in noncardiac tissues, such as the carpal tunnel and spinal ligaments. Whereas ATTRwt amyloidosis has been reported to have a male predominance of more than 90% in most studies to date, women develop this condition and may be underdiagnosed. The AI-ECG model may be able to suggest the diagnosis of ATTRwt amyloidosis in women in the absence of classic echocardiographic findings. The ability to use single-lead and 6-lead acquisition holds promise for simple and cost-effective global screening of at-risk populations, especially those with limited access to advanced cardiac imaging.

Cardiac amyloidosis results in electrocardiographic changes that may develop well ahead of clinical diagnosis and are detected by the application of Alto the standard ECG, a ubiquitous and inexpensive test. Despite increased awareness and improved imaging techniques, delays in diagnosis of CA continue to lead to tragic outcomes. The use of this AI-ECG model to detect CA may promote early diagnosis and initiation of potentially lifesaving therapy.

REFERENCES

1. Muchtar E, Gertz M A, Kumar S K, et al. Improved outcomes for newly diagnosed AL amyloidosis between 2000 and 2014: cracking the glass ceiling of early death. Blood. 2017; 129(15): 2111-2119.
2. Lousada I, Comenzo R L, Landau H, Guthrie S, Merlini G. Light chain amyloidosis: patient experience survey from the Amyloidosis Research Consortium. Adv Ther. 2015; 32(10):920-928.
3. Ruberg F L, Grogan M, Hanna M, Kelly J W, Maurer M S. Transthyretin amyloid cardiomyopathy: JACC state-of-the-art review. I Am Coll Cardiol. 2019; 73(22):2872-2891.
4. Alexander K M, Evangelisti A, Witteles R M. Diagnosis and treatment of cardiac amyloidosis related to plasma cell dyscrasias. Cardiol Clin. 2019; 37(4):487-495.
5. Maurer M S, Schwartz J H, Gundapaneni B, et al. Tafamidis treatment for patients with transthyretin amyloid cardiomyopathy. N Engl J Med. 2018; 379(11):1007-1016.
6. Falk R H, Alexander K M, Liao R, Dorbala S. AL (light-chain) cardiac amyloidosis: a review of diagnosis and therapy. J Am Coll Cardiol. 2016; 68(12):1323-1341.
7. Gertz M A, Dispenzieri A, Sher T. Pathophysiology and treatment of cardiac amyloidosis. Nat Rev Cardiol. 2015; 12(2):91-102.
8. Grogan M, Scott C G, Kyle R A, et al. Natural history of wild-type transthyretin cardiac amyloidosis and risk stratification using a novel staging system [erratum appears in J Am Coll Cardiol. 2017; 69(23):2882]. J Am Coll Cardiol. 2016; 68(10):1014-1020.
9. Gillmore J D, Maurer M S, Falk R H, et al. Non-biopsy diagnosis of cardiac transthyretin amyloidosis. Circulation. 2016; 133(24):2404-2412.
10. Sperry B W, Ikram A, Hachamovitch R, et al. Efficacy of chemo-therapy for light-chain amyloidosis in patients presenting with symptomatic heart failure. J Am Coll Cardiol. 2016; 67(25): 2941-2948.
11. Murtagh B, Hammill S C, Gertz M A, Kyle R A, Tajik A J, Grogan M. Electrocardiographic findings in primary systemic amyloidosis and biopsy-proven cardiac involvement. Am J Cardiol. 2005; 95(4):535-537.
12. Ko W Y, Siontis K C, Attia Z I, et al. Detection of hypertrophic cardiomyopathy using a convolutional neural network-enabled electrocardiogram. J Am Coll Cardiol. 2020; 75(7):722-733.
13. Vrana!A. Classification of amyloidosis by laser microdissection and mass spectrometry based proteomic analysis in clinical biopsy specimens. Blood. 2009; 114(24): 4957-4959.
14. Dorbala S, Ando Y, Bokhari S, et al. ASNC/AHA/ASE/EANM/HFSA/ISA/SCMR/SNMMI expert consensus recommendations for multimodality imaging in cardiac amyloidosis: part 2 of 2ddiagnostic criteria and appropriate utilization. J Card Fail. 2019; 25(11):854-865.
15. Attia Z I, Friedman P A, Noseworthy P A, et al. Age and sex estimation using artificial intelligence from standard 12-lead ECGs. Circ Arrhythm Electrophysiol. 2019; 12(9):e007284.
16. Goodfellow I, Bengio Y, Courville A. Deep Learning. Cambridge, MA: The MIT Press; 2016.
17. Youden W J. Index for rating diagnostic tests. Cancer. 1950; 3(1): 32-35.
18. R Core Team. R: a language and environment for statistical computing, version 3.5.3. Vienna, Austria: R Foundation for Statistical Computing; 2019.
19. Gurwitz J H, Maurer M S. Tafamidisda pricey therapy for a not-so-rare condition. JAMA Cardiol. 2020; 5(3): 247-248.

20. Castano A, Narotsky D L, Hamid N, et al. Unveiling transthyretin cardiac amyloidosis and its predictors among elderly patients with severe aortic stenosis undergoing transcatheter aortic valve replacement. Eur Heart J. 2017; 38(38):2879-2887.
21. Gonzalez-Lopez E, Gallego-Delgado M, Guzzo-Merello G, et al. Wild-type transthyretin amyloidosis as a cause of heart failure with preserved ejection fraction. Eur Heart J. 2015; 36(38): 2585-2594.
22. Buxbaum I N, Ruberg F L. Transthyretin V122I (pV142I)*cardiac amyloidosis: an age-dependent autosomal dominant cardiomyopathy too common to be overlooked as a cause of significant heart disease in elderly African Americans. Genet Med. 2017; 19(7):733-742.
23. Rapezzi C, Merlini G, Quarta C C. Systemic cardiac amyloidosis: disease profiles and clinical courses of the 3 main types. Circulation. 2009; 120(13):1203-1212.
24. Maleszewski J J. Cardiac amyloidosis: pathology, nomenclature, and typing. Cardiovasc Pathol. 2015; 24(6):343-350.
25. Fealey M E, Edwards W D, Buadi F K, Syed I S, Grogan M. Echocardiographic features of cardiac amyloidosis presenting as endomyocardial disease in a 54-year-old male. J Cardiol. 2009; 54(1):162-166.
26. Suresh R. Advanced cardiac amyloidosis associated with normal interventricular septal thickness: an uncommon presentation of infiltrative cardiomyopathy. J Am Soc Echocardiogr. 2014; 27(4): 440-447.
27. Tison G H, Zhang J, Delling F N, Deo R C. Automated and interpretable patient ECG profiles for disease detection, tracking, and discovery. Circ Cardiovasc Qua! Outcomes. 2019; 12(9): e005289.

All publications (including patents, patent applications and sequence accession numbers mentioned herein) are hereby incorporated by reference in their entirety as if each individual publication was specifically and individually indicated to be incorporated by reference. In case of conflict, the present application, including any definitions herein, will control.

Those skilled in the art will recognize, or be able to ascertain using no more than routine experimentation, many equivalents to the specific embodiments of the invention described herein. Such equivalents are intended to be encompassed by the following claims.

What is claimed is:

1. A method for screening for cardiac amyloidosis by electrocardiography, wherein the method comprises:
   receiving, using at least a processor, voltage-time data of a subject, wherein the voltage-time data comprises voltage data from a plurality of leads of an electrocardiograph;
   generating, using the at least a processor, a feature vector from the voltage-time data; and
   identifying, using the at least a processor, a presence or absence of cardiac amyloidosis (CA) in the subject as a function of the feature vector using a learning system comprising a first neural network comprising spatial and temporal feature extraction layers, wherein the at least a processor is configured to:
      train the first neural network implementing at least runs of 30 epochs with at least a learning rate of 0.001;
      prepare a validation set by assigning at least one case associated with a presence of CA and at least one control associated with an absence of CA using outcome-stratified random sampling;
      evaluate the first neural network on the validation set by determining an area under a receiver operating characteristic curve (AUC);
      compare the AUC of the first neural network and each AUC of a plurality of additional neural networks having differing structures;
      select a neural network with a highest AUC from all AUCs of the first neural network and the plurality of additional neural networks;
      tune a threshold by selecting a point, having a highest index value, on an AUC associated with the selected neural network and the validation set, and designating a corresponding threshold as optimal; and
      utilize the selected neural network and the threshold to identify the presence or absence of CA in the subject.

2. The method of claim 1, wherein generating the feature vector comprises generating a spectrogram based on the voltage data of the plurality of leads.

3. The method of claim 1, wherein generating the feature vector comprises grouping the voltage data of the plurality of leads into a plurality of subsets.

4. The method of claim 1, wherein the method further comprises:
   receiving, using the at least a processor, demographic data associated with the subject; and
   generating, using the at least a processor, the feature vector as a function of the demographic data and the voltage-time data.

5. The method of claim 1, wherein the method further comprises:
   receiving, using the at least a processor, genomic data associated with the subject; and
   generating, using the at least a processor, the feature vector as a function of the genomic data and the voltage-time data;
   wherein the genomic data is derivable from a biological sample that is derivable from a hereditary patient carrying a mutation.

6. The method of claim 1, wherein the voltage-time data of the subject is received from an electrocardiograph.

7. The method of claim 1, wherein the voltage-time data of the subject is received from an electronic medical record.

8. The method of claim 1, wherein the feature vector comprises a matrix, wherein the matrix comprises:
   a plurality of rows corresponding to a temporal dimension; and
   a plurality of columns corresponding to a spatial dimension.

9. The method of claim 8, wherein each row of the plurality of rows corresponds to at least one lead of the plurality of leads.

10. The method of claim 8, wherein each column of the plurality of columns corresponds to at least one timestamp.

11. A system for screening for cardiac amyloidosis by electrocardiograph; wherein the system comprises:
   at least a processor;
   a computer readable storage medium communicatively connected to the at least a processor, wherein the computer readable storage medium contains instructions configuring the at least a processor:
      receive voltage-time data of a subject, wherein the voltage-time data comprises voltage data from a plurality of leads of an electrocardiograph;
      generate a feature vector as a function of the voltage-time data; and
      identify a presence or absence of cardiac amyloidosis (CA) in the subject as a function of the feature vector using a learning system comprising a first neural network comprising spatial and temporal feature extraction layers, wherein the at least a processor is configured to:
  train the first neural network implementing at least runs of 30 epochs with at least a learning rate of 0.001;
prepare a validation set by assigning at least one case associated with a presence of CA and at least one control associated with an absence of CA using outcome-stratified random sampling;
  evaluate the first neural network on the validation set by determining an area under a receiver operating characteristic curve (AUC);
  compare the AUC of the first neural network and each AUC of a plurality of additional neural networks having differing structures;
  select a neural network with a highest AUC from all AUCs of the first neural network and the plurality of additional neural networks;
  tune a threshold by selecting a point, having a highest index value, on an AUC associated with the selected neural network and the validation set, and designating a corresponding threshold as optimal; and
  utilize the selected neural network and the threshold to identify the presence or absence of CA in the subject.

12. The system of claim 11, wherein generating the feature vector comprises generating a spectrogram based on the voltage data of the plurality of leads.

13. The system of claim 11, wherein generating the feature vector comprises grouping the voltage data of the plurality of leads into a plurality of subsets.

14. The system of claim 11, wherein the computer readable storage medium contains further instructions configuring the at least a processor to:
  receive demographic data associated with the subject; and
  generate the feature vector as a function of the demographic data and the voltage-time data.

15. The system of claim 11, wherein the computer readable storage medium contains further instructions configuring the at least a processor to:
  receive genomic data associated with the subject; and
  generate the feature vector as a function of the genomic data and the voltage-time data;
  wherein the genomic data is derivable from a biological sample that is derivable from a hereditary patient carrying a mutation.

16. The system of claim 11, wherein the voltage-time data of the subject is received from an electrocardiograph.

17. The system of claim 11, wherein the voltage-time data of the subject is received from an electronic medical record.

18. The system of claim 11, wherein the feature vector comprises a matrix, wherein the matrix comprises:
  a plurality of rows corresponding to a temporal dimension; and
  a plurality of columns corresponding to a spatial dimension.

19. The system of claim 18, wherein each row of the plurality of rows corresponds to at least one lead of the plurality of leads.

20. The system of claim 18, wherein each column of the plurality of columns corresponds to at least one timestamp.

* * * * *